United States Patent [19]

Sharp et al.

[11] Patent Number: 5,381,253
[45] Date of Patent: Jan. 10, 1995

[54] CHIRAL SMECTIC LIQUID CRYSTAL OPTICAL MODULATORS HAVING VARIABLE RETARDATION

[75] Inventors: Gary D. Sharp, Boulder; Kristina M. Johnson, Longmont, both of Colo.; Mark O. Freeman, Hsinchu,

[73] Assignee: Board of Regents of University of Colorado, Boulder, Colo.

[21] Appl. No.: 792,284

[22] Filed: Nov. 14, 1991

[51] Int. Cl.⁶ .................. G02F 1/133; G02F 1/1335
[52] U.S. Cl. ........................ 359/53; 359/70; 359/73; 359/260
[58] Field of Search ............... 359/73, 53, 70, 71, 359/260

[56] References Cited

U.S. PATENT DOCUMENTS

| | | | |
|---|---|---|---|
| 3,866,139 | 2/1975 | Currie | 359/260 |
| 4,232,948 | 11/1980 | Shanks | 359/53 |
| 4,367,924 | 1/1983 | Clark et al. | 359/100 |
| 4,563,059 | 1/1986 | Clark et al. | 359/100 |
| 4,779,959 | 10/1988 | Saunders | 359/78 |
| 4,790,632 | 12/1988 | Miller et al. | 356/352 |
| 4,838,663 | 6/1989 | Lagerwall et al. | 359/100 |
| 4,941,735 | 7/1990 | Moddel et al. | 359/72 |
| 5,033,825 | 7/1991 | Ishikawa et al. | 359/73 |
| 5,132,826 | 7/1992 | Johnson et al. | 359/56 |
| 5,144,471 | 9/1992 | Takanashi et al. | 359/72 |
| 5,150,236 | 9/1992 | Patel | 359/71 |
| 5,168,383 | 12/1992 | Iwaki et al. | 359/56 |
| 5,187,603 | 2/1993 | Bos | 359/73 |

FOREIGN PATENT DOCUMENTS

| | | | |
|---|---|---|---|
| 0309774 | 4/1989 | European Pat. Off. | |
| 2238200 | 7/1974 | France | |
| 61-231524 | 10/1986 | Japan | 359/87 |
| 62-5218 | 1/1987 | Japan | 359/87 |
| 9009614 | 8/1990 | WIPO | 359/73 |

OTHER PUBLICATIONS

Soref, "Field Effects in Nematic Liquid Crystals Obtained with Interdigital Electrodes", Journal of Applied Physics, vol. 45, No. 12, Dec. 1974, pp. 5466-5468.

Sharp et al., "Smectic Liquid Crystal Tunable Filters", Ferroelectrics, vol. 114, 1991, pp. 55-69.

Masterson et al., "Ferroelectric Liquid Crystal Tunable Filter", Optics Letters, vol. 14, No. 22, Nov. 1989, pp. 1249-1251.

Andersson et al., "Device Physics of Soft Mode Electro-Optic Effect", Journal of Appl. Phys; vol. 66, No. 10, Nov. 1989, pp. 4983-4995.

Funfschilling et al., "Fast Responding and Highly Multiplexible Distorted Helix Ferroelectric Liquid Crystal-Displays", J. Appl. Phys. vol. 66, No. 8, Oct. 1989, pp. 3877-3882.

Clark et al., "Submicrosecond Bistable Electro-Optic Switching in Liquid Crystals", Appl. Phys. Lett., vol. 36, No. 11, Jun. 1980, pp. 899-901.

Lagerwall et al., "Ferroelectric Liquid Crystals", Mol. Cryst. Liq. Cryst., vol. 114, 1984, pp. 151-187.

Nishiyama et al., "Antiferroelectric . . . Chiral Part", Jap. Journal Appl. Phys., vol. 28, No. 12, Dec. 1989, pp. 2248-2250.

(List continued on next page.)

*Primary Examiner*—William L. Sikes
*Assistant Examiner*—Ron Trice
*Attorney, Agent, or Firm*—Greenlee and Winner

[57] ABSTRACT

The present invention provides optical modulators which comprise aligned chiral smectic liquid crystal cells within an optical resonance cavity. The cavity configurations include symmetric and asymmetric Fabry-Perot etalons. The liquid crystal cells can be planar- or homeotropically-aligned and can be discrete state or analog cells. The device configurations of the present invention provide discrete or continuous optical modulation of the phase, intensity, and wavelength of elliptically polarized light, without requiring polarization analyzers. The modulators are optically or electronically addressable in single pixels or arrays of multiple pixels. Certain homeotropically-aligned cells are provided as an aspect of this invention, as are certain variable retarders comprised of planar-aligned cells in combination with birefringent elements.

74 Claims, 7 Drawing Sheets

OTHER PUBLICATIONS

Chandani et al., "Tristable Switching . . . Polarization", Jap. Journal, Appl. Phys. vol. 27, No. 5, May 1988, pp. 729–732.

Sharp et al., "Continuously Tunable Smectic A* Liquid Crystal Color Filter", Optical Society of America, vol. 15, No. 10, May 1990, pp. 523–525.

Liu et al., "Second-Harmonic Generation in Ferroelectric Liquid Crystals", Optical Letters, vol. 15, No. 5, Mar. 1990, pp. 267–269.

Moddel et al., "High Speed Binary Optically Addressed Spatial Light Modulator", Appl. Phys. Lett. 55(6), Aug. 1989, pp. 537–539.

Hirabasjashi et al., "New Structure of Tunable Wavelength Selective Filters with a Liquid Crystal for FOM Systems", IEEE Photonics Technology Letters, vol. 3, No. 8, Aug. 1991, pp. 741–743.

Brodzeli et al., "Optical Response of Homeotropically Aligned Ferroelectric Liquid Crystal", Technical Digest on SLM's and Their Applications, vol. 15, 1989, pp. 128–131.

Patel et al., "Multiwavelength Tunable Liquid-Crystal Etalon Filter", IEEE Photonics Technology Letters, vol. 3, No. 7, Jul. 1991, 643–644.

Abdulhalim et al., "High Speed Analog Spatial Light Modulator using Hydrogenated Amorphous Silicon Photosensor and an Electroclinic Liquid Crystal", Appl. Phys. Lett. 55(16), Oct. 1989, pp. 1603–1605.

Biernacki et al., "Polarization Dependence and Uniformity of FLC Layers for Phase Modulation", Proceedings of SPIE, SPIE Conference: Liquid Crystal Devices and Materials, San Jose, Calif., Feb. 25–27, 1991, pp. 167–178.

Maeda et al., "Electronically Tunable Liquid-Crystal-Etalon Filter for High Density WDM Systems", IEEE Photonics Technology Letters, vol. 2, No. 11, Nov. 1990, pp. 820–822.

Evans, John W., "The Birefringent Filter", Journal of the Optical Society of America, Mar. 1949, pp. 229–242.

Title, Alan M. and Rosenberg, Wm. J., "Tunable Birefringent Filters", May 23, 1981; Optical Engineering, Nov./Dec. 1981, pp. 815–823.

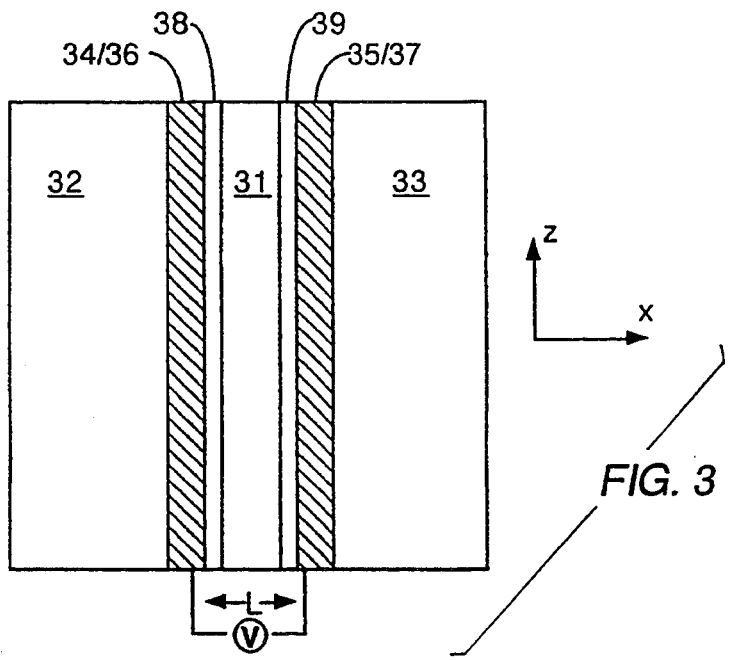
FIG. 3
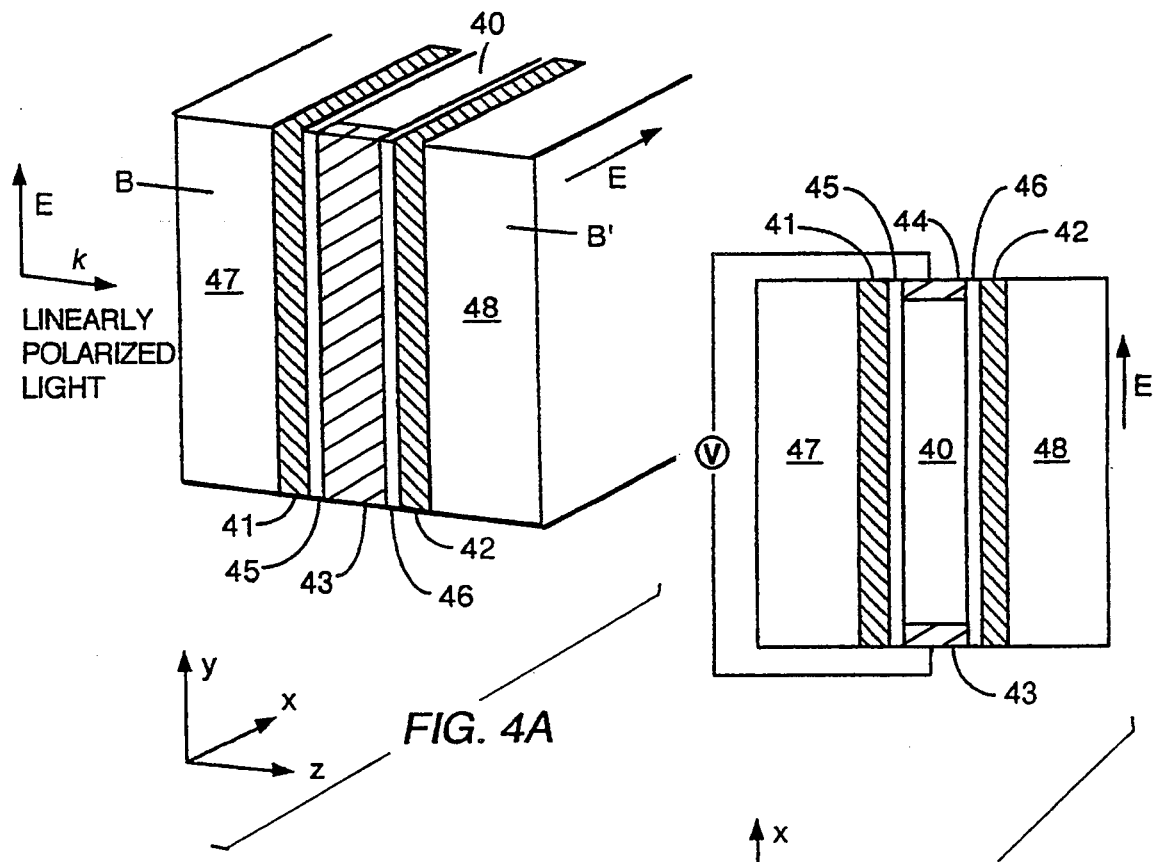
FIG. 4A
FIG. 4B

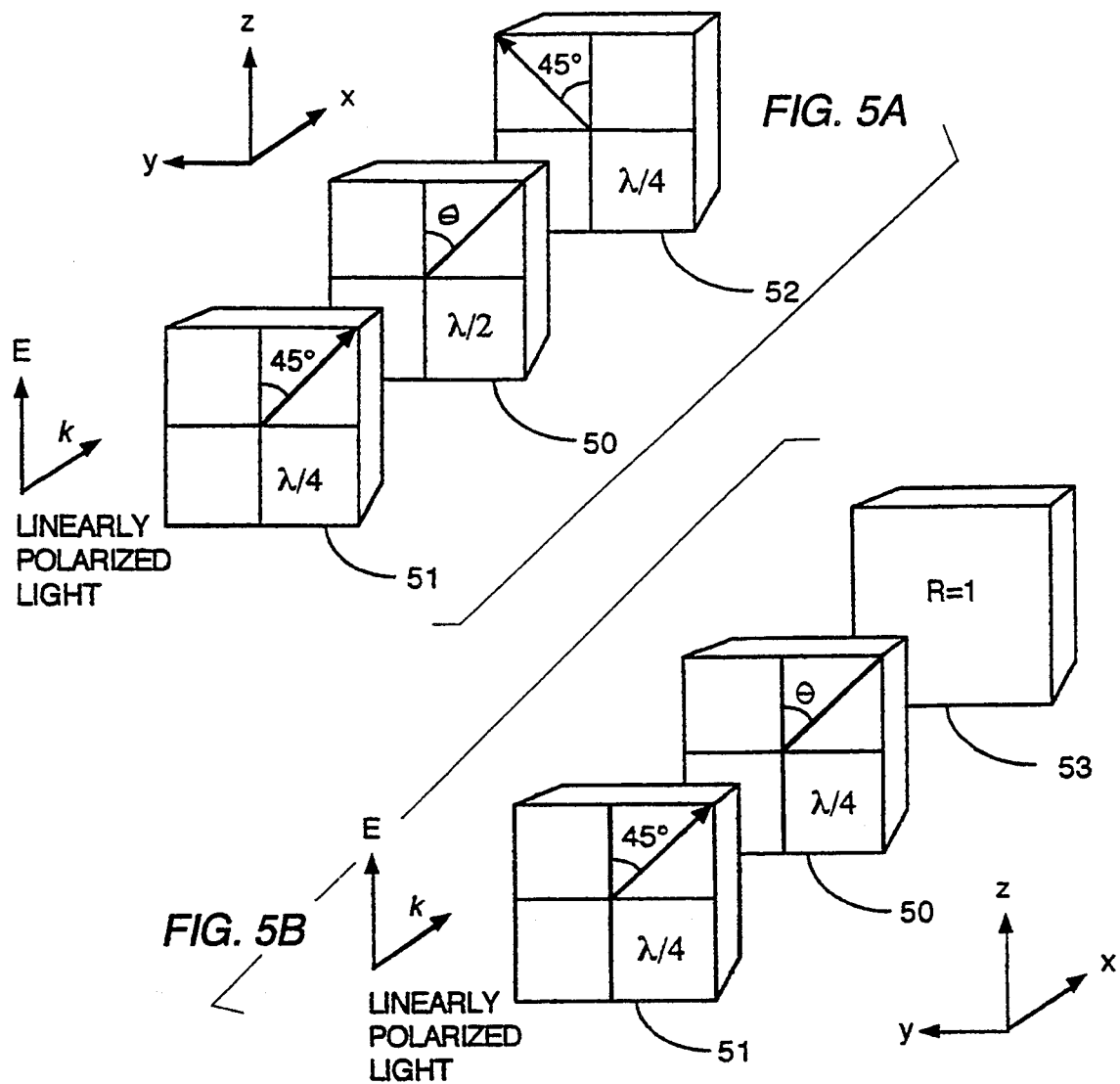
FIG. 5A
FIG. 5B
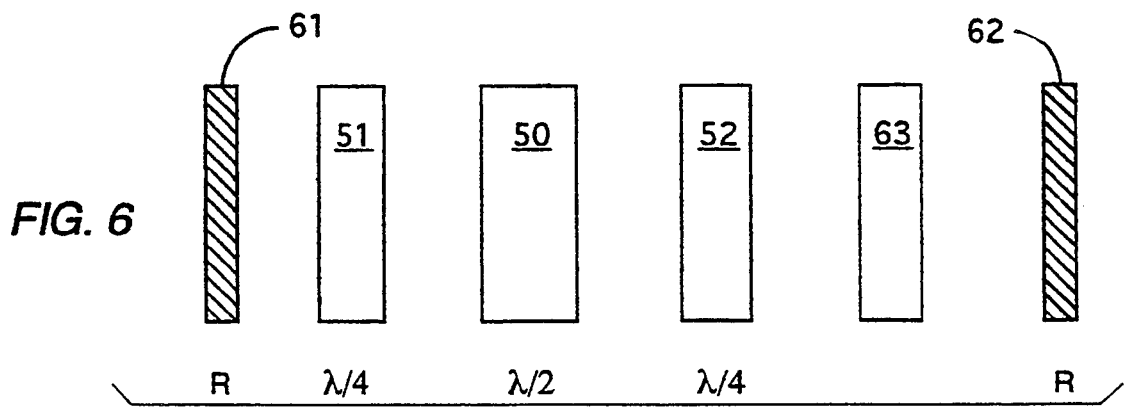
FIG. 6

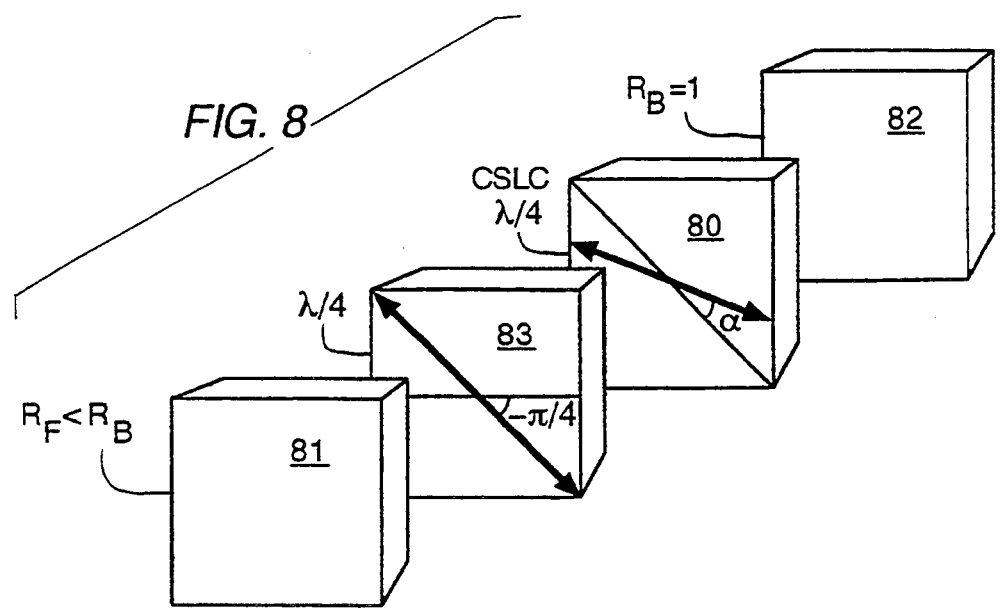
FIG. 8
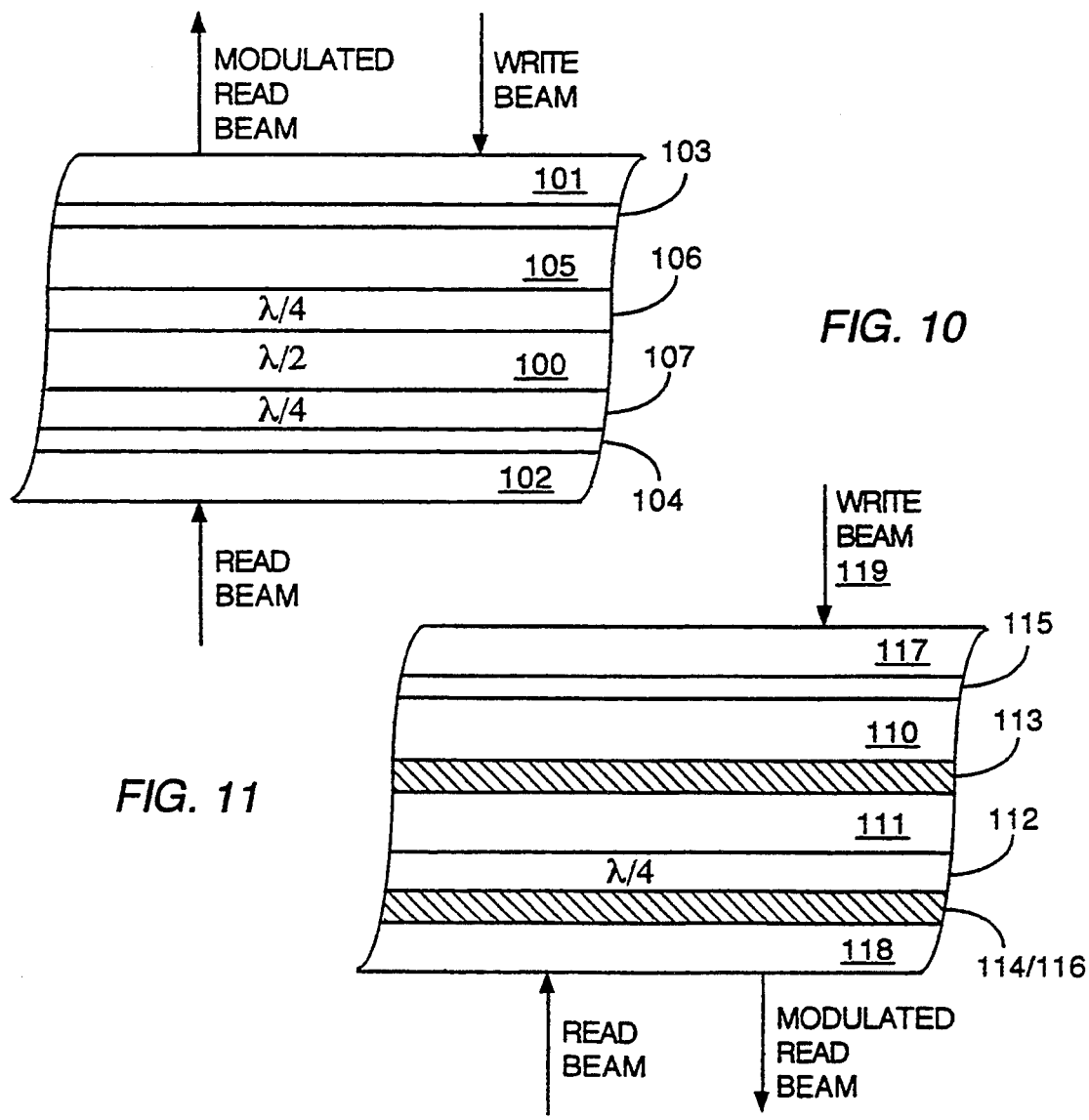
FIG. 10
FIG. 11

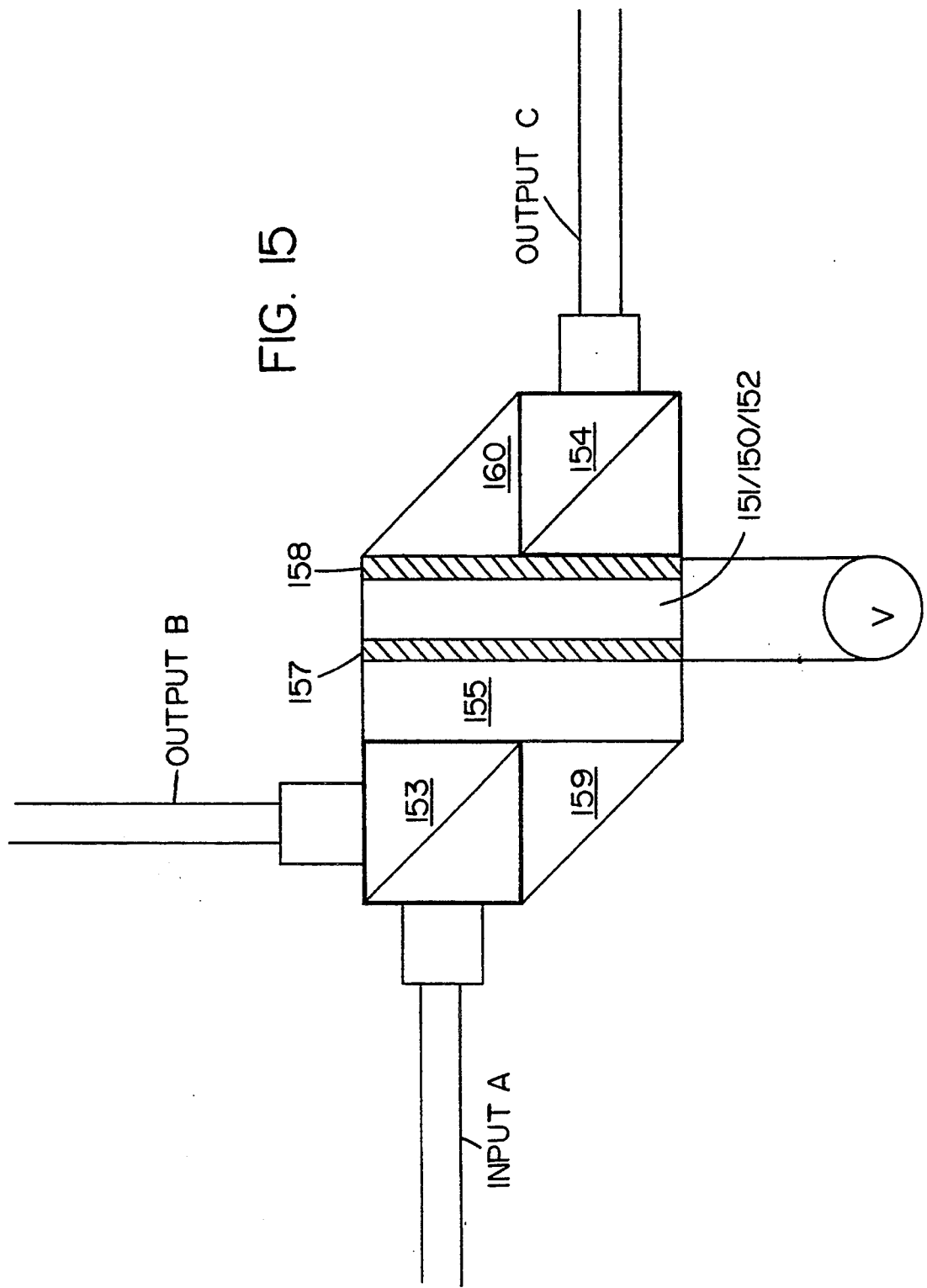

CHIRAL SMECTIC LIQUID CRYSTAL OPTICAL MODULATORS HAVING VARIABLE RETARDATION

FIELD OF THE INVENTION

The present invention relates to tunable electro-optical modulators having a folded optical path structure using chiral smectic liquid crystal materials as tuning elements and, in particular, relates to Fabry-Perot interferometer and etalon modulators.

BACKGROUND OF THE INVENTION

Non-ferroelectric, non-chiral, liquid crystals have been utilized as electro-optic materials in a number of applications requiring low drive voltages, large apertures, low cost and compact structures. These include watch, calculator and television displays, spatial light modulators, real-time holographic media, switches and tunable filters. These liquid crystal devices operate on the basic principle that due to the dielectric anisotropy of nematic, cholesteric and smectic liquid crystals, the average molecular axis, or director, can be oriented in the presence of an applied electric field. The coupling of non-ferroelectric liquid crystals to the applied field is a weak, second order interaction. In general, slow response times are characteristic of non-ferroelectric, non-chiral, liquid crystal optical devices.

Meyer et al. ("Ferroelectric Liquid Crystals", in Le Journal de Physique, Vol. 36, March, 1975, pp. L69-L71) showed that chiral C* or H*, smectic liquid crystals, could be ferroelectric, that is, possess a permanent electric dipole density, P. This permanent polarization, P, is perpendicular to the average orientation of the long axis of the molecules (denoted by the molecular director, $\hat{n}$,) and generally contained within a plane parallel to the smectic layers. In these chiral smectic liquid crystals (CSLCs), the molecular director makes a temperature dependent angle, $\Psi$, with respect to the layer normal, $\hat{z}$, as shown in FIGS. 1 and 2. In general, $\Psi$ ranges from 0° to 45°. The presence of the electric dipole provides a much stronger coupling to the applied electric field as compared to non-ferroelectric liquid crystals. Furthermore, the coupling, and hence aligning torque is about linear with applied field. The significance of this is that changing the sign of the applied electric field will change the direction of P in smectic C*, H*, A* and other chiral smectic phase liquid crystals. While $\hat{n}$ is constrained to an angle, $\Psi$, relative to $\hat{z}$, the chiral nature of these materials causes $\hat{n}$ to rotate by angle $\phi$ about the layer normal, forming a large number of degenerate energy states oriented along a cone in bulk CSLC samples. The molecular directors are free to rotate by $\phi$ from layer to layer, and the cone structure forms a helix along the $\hat{z}$ direction. Therefore, even though chiral smectic liquid crystals possess microscopic permanent polarization, they cancel in the bulk in the planar-aligned orientation, producing little if any macroscopic polarization, or ferroelectric properties.

N. A. Clark et al. in U.S. Pat. No. 4,367,924, realized a ferroelectric liquid crystal switching device by sandwiching a thin layer of a smectic C* (SmC*) liquid crystal between two glass plates coated with transparent electrodes. In this patent, they describe the surface-stabilized ferroelectric liquid crystal (SSFLC) device, which employs SmC* or SmH* liquid crystal phases in the so-called bookshelf geometry, otherwise designated the planar alignment, where the smectic layers are perpendicular to and the liquid crystal molecules are parallel to the glass plates which also contain the electrodes, as illustrated in FIG. 1. Surface stabilization suppresses the helix, and allows the molecular directors to align in one of two states, $\pm\Psi$ to the layer normal. In the chiral smectic C,F,G,H,I liquid crystalline phases, a planar-aligned, surface-stabilized cell results in a binary, intensity switching device (see also N. A. Clark et al. U.S. Pat. No. 4,563,059 and N. A. Clark and S. T. Lagerwall in Applied Phys. Letts. (1980) 36:899 and S. T. Lagerwall and I. Dahl Mol. Cryst. Liq. Cryst. (1984) 114:151–187). The application of the electric field, thus, selects between the discrete orientations (two for SmC* materials) of the optic axis of the cell, each of which represents a different optical transmission states of the cell. The voltage required for switching such cells are modest ($\pm$10V), and power consumption is quite low because the FLC switching energy required is small. SSFLC SmC* materials have been shown to be useful in a number of electro-optic device applications including switches, shutters, displays and spatial light modulators (SLM's). The materials most commonly employed have $\Psi$ of $\pm22.5°$ ($\pi/8$) and switch between two stable states by a rotation of the optic axis of $2\Psi$ or 45° ($\pi/4$). Typically in a SSFLC light switch, SmC* layer thickness is selected to provide a retardation of $\pi$ (i.e., a half-wave) at a design wavelength. In this case, input polarization, which is aligned with the optic axis of the SmC* material in one of its states, is rotated by 45° ($\pi/4$), i.e., two times an angle between the polarized input and the optic axis of the crystal (by a reflection about the fast axis of the crystal) when the field across the cell is reversed. Such a device therefore functions as a binary, intensity modulator. The advantages of these chiral smectic C,F,G,H, and I liquid crystal devices is their nearly three orders of magnitude increase in switching speeds over non-chiral liquid crystal devices and their intrinsic bistability, which has applications for optical memory units.

Tristable switching of a planar-aligned CSLC cell has been reported (I. Nishiyama et al. (1989) Jpn. J. App. Phy. 28:L2248; and A. D. I. Chandani et al. (1988) Jpn. J. App. Phy. 27:L729. The observed switching has a dc threshold and a hysteresis of the threshold voltage. The third state of such tristable cells has been linked with the presence of an antiferroelectric phase, designated SmCA*. This type of CSLC cell has been designated an antiferroelectric LC cell. The antiferroelectric phase can, for example, be generated in a SmC* material by application of an ac field across the planar-aligned liquid crystal. It has been suggested that the applied ac field induces molecular rearrangement in which the LC molecules are aligned via the large spontaneous polarization of the material. CSLC materials which can exhibit this antiferroelectric effect have been reported by K. Furukawa et al. (1988) Ferroelectrics 85:63; M. Johno et al. (1989) Jpn. J. App. Phy. 28:L119 and Y. Suzuki et al. (1989) Liq. Cryst. 6:167.

Lagerwall et al. in U.S. Pat. No. 4,838,663, describe a non-tilted, non-ferroelectric, chiral smectic A* (SmA*) liquid crystal electro-optic switch. With planar-aligned, surface-stabilized SmA* material between substrate walls with no electric field applied (zero field state), $\hat{n}$ is parallel to $\hat{z}$ (i.e., $\Psi=0°$). The molecular director of the SmA* material exhibits rotation in a plane relative to $\hat{z}$ ($\Psi\neq0°$) in response to an applied electric field due to the electroclinic effect (first described by S. Garaff and R. B. Meyer (1977) Phys. Rev. Letts. 38:848). These cells display an analog dependence of $\Psi$ with applied field to a maximum tilt angle $\Psi_{MAX}$, which angle is an intrinsic property of the SmA* material. Materials having $\Psi_{MAX}$ ranging from about 6° to 22.5° have been observed. The advantage of these planar-aligned SmA* cells is submicrosecond switching speeds and analog rotation of the optic axis.

A single SmA* cell between crossed or parallel polarizers yields less than optimal contrast or modulation depth due to the presently available small electroclinic tilt angle. The dynamic range of such a light switch can be improved by incorporating a series of two or more SmA* half-wave plates between crossed polarizers with sequential SmA* cells tilting in opposite directions from one another. Unfortunately, the improved dynamic range is often accomplished at the expense of cost, device simplicity and ease of operation. See also Sharp, G. D. et al., *Optics Letters* (1990) pp. 523–525.

L. A. Beresnev et al., European Patent Application No. 309774, published 1989, has recently described a new type of chiral smectic ferroelectric liquid crystal cell called the distorted helix ferroelectric (DHF), liquid crystal cell. This type of device is similar to the planar-aligned chiral SmA* device of Lagerwall et al., except that it is not strongly surface-stabilized, so that the helix along the direction of the layer normal, $\hat{z}$ is not suppressed. When the pitch of the helix (defined as the distance between identical orientations of $\hat{n}$ along the helix) is much shorter than the wavelength or wavelengths of light incident upon the device, light traversing the material sees an index of refraction given by the average orientation of the molecular directors. Application of an applied electric field to the DHF cell perpendicular to $\hat{z}$, partially orients the molecular directors by an angle $\Psi$ to $\hat{z}$. The angle $\Psi$ is dependent on the size and magnitude of the field so the DHF device operates in an analog mode similar to a SmA* device. In a DHF device there is a change in the birefringence of the material as the molecules align, which does not occur in either the SSFLC SmC* or planar-aligned SmA* device. The DHF materials, such as Hoffmann-La Roche DHF 6300, having $\Psi_{MAX}$ as large as ±37° have been described. The advantage of DHF switching devices over other FLC switching devices described above is the variable birefringence with applied voltage. This is similar to the operation of nematic liquid crystals, which also yield a variable birefringence with applied voltage. In contrast to nematic liquid crystals, the DHF molecular directors rotate by their full tilt angle within 40 μsec, a significant advantage. Furthermore, the voltages required to rotate the optic axis are generally much lower than those required for SmA* and SmC* cells. An interesting feature of DHF devices is the coupling of the change in birefringence with the rotation of the optic axis as a function of applied voltage.

Z. M. Brodzeli et al. (1990) Technical Digest on SLM's and Their Applications 14:128 have reported fast electro-optic response (20 μsec) in a homeotropically-aligned SmC* liquid crystal. In homeotropic alignment, the smectic layers of the liquid crystal are parallel to the surfaces of the substrate walls (see FIG. 2) and as in planar-aligned CSLCs, the molecular director makes an angle, $\Psi$, with the layer normal. In the optical modulator described by Brodzeli et al., the homeotropically-aligned SmC* material is positioned between substrate walls having deposited electrodes (the width of the cell was given as 17 μm.) Polarized non-monochromatic light entering the device, propagating along the axis normal to the layers, was reported to be modulated in intensity by application of a voltage across the electrodes.

J. Y. Liu et al. (1990) Optics Letts 15(5):267 report second-harmonic generation in homeotropically-aligned SmC* LC cells across which a dc electric field of 1 kV was applied.

Phase modulation of optical signals is often accomplished by means of an electro-optic effect in which a change in index of refraction of a suitable material is achieved with the application of an electric field. With crystalline materials exhibiting second-order optical nonlinearity, the electric field changes the index of refraction of such materials when seen by the incident optical field. The Pockel's effect refers to the linear variation of birefringence of non-centrosymmetric materials (including KD*P and $LiNbO_3$) as a function of an applied electric field. The electric field perturbs the electron energy function, thus changing the index of refraction by approximately 0.01–0.001. There are two common Pockel cell modulators, referred to as transverse and longitudinal, depending on whether the applied electric field is perpendicular or parallel to the direction of light propagation. The related Kerr effect generally induces a birefringence in proportion to the length of the material, and the square of the electric field in isotropic materials. For both of these effects, it is an electronic excitation of the material that interacts with incident light.

Electroabsorptive phenomena such as the Franz-Keldysch and the Quantum Confined Stark effects can be also be used to modulate light. In the former, the absorption spectrum of a III-V material such as GaAs/GaAlAs is broadened by the application of an applied electric field (An example is the self-electro-optic effect device described in D. A. B. Miller, U.S. Pat. No. 4,546,244, and in the latter, the absorption edge is shifted by an applied electric field.

While the Pockel's and Kerr effects are high speed effects, they require large voltages, for bulk implementations in order to achieve very small electro-optic effects. For example, a half-wave of phase shift resulting from these electro-optic effects usually requires voltages on the order of kilovolts in electro-optic crystals such as $LiNbO_3$, $LiTaO_2$, KTP, etc. See, e.g., Yariv, A. and Yeh, P. *Optical Waves in Crystals* (1983) Wiley and Sons, New York Electroabsorptive modulators are also high speed, but suffer from limited throughput, and low contrast ratio.

A technique that has been used to improve the characteristics of electro-optic Pockel's and Kerr effect phase modulators, is to fold the optical path length using a Fabry-Perot etalon or resonator. This technique relies on interference of waves within the cavity and requires a lower voltage to achieve a desired phase shift compared to non-etalon electro-optic modulators. By virtue of the non-linear intensity transmission function of the Fabry-Perot resonator, a small induced phase change in turn produces a large intensity modulation. In other words, a Fabry-Perot etalon transforms the low amplitude input signal to an output optical intensity with high contrast. See Yariv, A. and Yeh, P. (1984) Optical Waves in Crystals, Chapter 8, John Wiley and Sons, New York.

This method can be used, with the resonance cavity operating in transmission mode or reflection mode, to obtain a large modulation depth with only a small electro-optically induced phase shift. However, because the electro-optic effect is very small, the cavity finesse must be very large to achieve a large optical modulation. A draw back of high cavity finesse, on the other hand, is low optical throughput.

A Fabry-Perot device consists of two plane parallel, highly reflecting surfaces, or mirrors, separated by a distance, L. When the mirrors are fixed at distance L, the device is called an etalon. When L can be varied the device is called an interferometer. A Fabry-Perot etalon operates on the principle of multiple interference of the waves reflected or transmitted by the mirrors. If L is a multiple of $\pi$, then the transmitted waves destructively interfere and the light incident upon the device is ideally totally reflected by the etalon. If L is a multiple of $2\pi$, then the waves reflected by the mirrors cancel, and all the light is ideally transmitted by the etalon (assuming no absorption losses). If the etalon thickness is somewhere in between $\pi$ and $2\pi$, then partial transmission or reflection occurs. If the optical thickness of the etalon can be changed, the etalon operates as a variable modulator.

Miller et al., U.S. Pat. No. 4,790,643, disclose an optically bistable device comprising a Fabry-Perot etalon containing an intracavity, optically non-linear, nematic liquid crystal material. The device provides an electro-optic bistable switch with possible applications in digital code modulation upon a laser beam. This device, however, has limited applications in that it is designed to modulate a monochromatic or coherent light source. The disclosed device is reportedly capable of tuning the etalon fringe electro-optically to a design wavelength such that a low intensity, coherent incident beam of a wavelength in proximity of the design wavelength induces bistable switching of the etalon. Since the liquid crystal of this device is neither chiral or ferroelectric, the switching speed of this particular optical modulator is relatively slow.

SUMMARY OF THE INVENTION

The present invention provides optical modulators which comprise folded optical path structures, etalons and interferometers containing chiral smectic liquid crystal materials within the optical cavity which function for optical modulation by an application of an electric field. The intensity, phase and wavelength modulators provided herein combine modest voltage requirements and low power consumption with rapid tuning. The device configurations of the present invention permit discrete or continuous optical modulation useful in a wide variety of applications including, among others, spectrometry, remote sensing, discrete modulation for differential absorption or transmission in optical filters, rapid wavelength modulation useful in color displays, intensity modulation for binary or gray-scale generation for shutters and SLMs, phase modulation for 2-D and 3-D holographic displays, SLMs, beam steering, refractive and diffractive optical elements. Folded optical path structures include optical modulators having Fabry-Perot (FP) interferometer and etalon structures and asymmetric Fabry-Perot cavities (i.e., Gires-Tournois etalons). The modulator configurations of the present invention are useful in single and multiple pixel elements which are electronically or optically addressable by a variety of means.

Most generally, this invention involves the positioning of an aligned layer of a chiral smectic liquid crystal material within an optical resonance cavity. As is conventional, an optical cavity is formed by opposed reflective surfaces. Preferably the reflective surfaces are such that a substantial portion of the light entering the cavity makes more than one pass through the cavity, i.e., having at least one reflection, before exiting the cavity. In a FP etalon or interferometer configuration, it is preferred that interference between at least two phase retarded waves of light occur before light exits the cavity. In an asymmetric FP configuration, folding the optical path increases the interaction length of light within the modulator. Typically, the reflective surfaces are plane parallel with respect to one another and at least one of the reflective surfaces is transmissive to allow entrance of light into the cavity. FP cavities can be operated in transmission/reflection- or reflection-only mode with the choice dependent on the modulation application and/or design requirements. The chiral smectic liquid crystal material is aligned between substrate walls and means for applying an electric field across the aligned material are provided such that molecular director of the material, i.e., optic axis, is rotatable on application of the electric field across the material. A dc or ac electric field, or both, may be applied to the cell to rotate the optic axis. In certain device configurations with $\vec{E}$ applied parallel to the smectic layers (i.e., E is perpendicular to $\hat{z}$), the optic axis is rotatable in a plane perpendicular to the direction of the applied field. The aligned chiral smectic liquid crystal material, substrate walls and means for application of an electric field across the liquid crystal comprise a chiral smectic liquid crystal cell. Light traversing the FP cavity containing a chiral smectic liquid crystal cell is modulated by rotation of the optic axis of the cell by application of an electric field. The modulators of the present invention optionally include isotropic spacer elements, lenses, birefringent elements and wave plates within the etalon cavity.

This invention specifically provides tunable optical modulators of elliptically polarized light which comprise FP interferometers and etalons wherein the resonance cavity contains an intracavity modulator element positioned between means for reflecting light entering that cavity. Certain optical modulator configurations herein are particularly useful with linearly polarized light. Preferably the reflective surfaces of the cavity are such that a substantial portion of the entering polarized light makes more than one pass through the intracavity modulator element before exiting the cavity. The intracavity modulator element comprises a chiral smectic liquid crystal cell having substrate walls between which is placed an aligned chiral smectic liquid crystal material and means for application of an electric field across the liquid crystal material to rotate its optic axis. The chiral smectic liquid crystal material can be planar- or homeotropically-aligned. Means for achieving the desired alignment, such as appropriate alignment layers, as is known in the art, can be provided on the inside surfaces of the substrate walls in contact with the chiral smectic liquid crystal material. The optical modulators of these specific embodiments do not require exit polarizer means or polarization analyzers to obtain the desired modulation. It may, however, be desired, in a particular application, to employ a polarization analyzer to select a certain polarization state of modulated light. FP-type interferometer and etalon configurations of the present invention, include binary and analog intensity, phase and wavelength modulation.

The invention also specifically provides tunable optical modulators of elliptically polarized light which comprise asymmetric FP cavities wherein the optical cavity contains an intracavity modulator element positioned between means for reflecting light entering the cavity. The light reflecting means in these modulators comprise one reflective surface having significantly higher reflectivity than the other reflective surface, ideally 1, such that the device operates in the reflection-only mode. Certain optical modulators herein are particularly useful with linearly polarized light. A substantial portion of the incident polarized light makes more than one pass (i.e., at least one reflection) and preferably makes more than two passes through the cavity before exiting the cavity. The intracavity modulator element comprises a chiral smectic liquid crystal cell. Both planar- and homeotropically-aligned materials can be employed and appropriate alignment means are optionally comprised within the CSLC cell. These specific embodiments do not require the use of a polarizer to detect optical modulation. The asymmetric FP etalon modulators of the present invention include binary and analog phase modulators.

Chiral smectic liquid crystal materials useful in the rapidly tunable or switchable modulators of the present invention include ferroelectric liquid crystal materials, electroclinic liquid crystal materials, distorted helix ferroelectric materials and antiferroelectric materials within cell configuration which allow rapid rotation of the optic axis of the liquid crystal material by application of an electric field. Chiral smectic liquid crystal cells include discrete state cells and analog cells. Within cells the chiral smectic liquid crystal material may be planar-aligned or homeotropically-aligned.

Discrete state cells are exemplified by planar-aligned, surface-stabilized ferroelectric liquid crystal and antiferroelectric cells having SmC* FLC materials. In SmC* cells, the substrate walls are transparent or semi-transparent and the electric field is applied across the liquid crystal layer perpendicular to the substrate walls typically by means of transparent conductive electrodes applied on the substrate walls. Light traverses these cells through the substrate walls. In such FLC cells, there are two orientations of the optic axis ($\hat{n}$) in the plane of the substrate walls and the angle between the two orientations of $\hat{n}$ is $2\Psi$, where $\Psi$ is the tilt angle, i.e., the angle that the long axis of the LC molecules makes with the smectic layer normal, $\hat{z}$. Typically, in such binary discrete state SSFLC cells, voltages of opposite sign are applied to the electrodes to select between the two orientations of the optic axis. Thus, changing the sign of the voltage applied across such a cell results in a discrete rotation of the optic axis of the cell in the plane of the substrate walls of $2\Psi$. Antiferroelectric liquid crystal cells display three selectable states, i.e., three discrete orientations of the optic axis, which can be accessed by varying an applied electric field, and are discrete state cells that can be employed in the modulators of the present invention.

Analog cells are exemplified by planar-aligned, surface-stabilized SmA* cells, also called electroclinic cells or soft-mode effect cells. These cells are analogous in structure and operation to the discretely switching SmC* cells, except that the optic axis of the material is continuously rotatable, approximately linearly with applied voltage, over a range of $2\Psi_{MAX}$, in the plane of the substrate walls, where $\Psi_{MAX}$ is the maximum angle of molecular tilt with respect to the layer normal. Distorted helix effect cells also display a voltage dependent continuous rotation of their optic axis and hence are deemed analog cells. However, a voltage dependent change in birefringence ($\Delta n$) is coupled with this rotation. Analog cells can be operated in a multiple discrete state mode by appropriate voltage application to the cell.

Certain homeotropically-aligned cells are provided as an aspect of this invention and are useful in this invention. These cells can have transparent or semi-transparent substrate walls and light can traverse the cell through the substrate walls (traversing the smectic layers) or through one of the sides of the cell (bisecting the smectic layers). In the homeotropic cell configurations of the present invention, an electric field is applied across the smectic layers, i.e., $\vec{E}$ is in the plane of the smectic layers, perpendicular to $\hat{z}$. In normal incidence, the applied field, $\vec{E}$, is preferably perpendicular to the direction of propagation of light entering the cell typically denoted by $\hat{k}$. Application of an electric field to such homeotropically-aligned cells results in rotation of $\hat{n}$ such that the birefringence of the cell for linearly polarized light entering the cell is changed, and the light is thereby modulated. Cells having SmC* and other discrete state CSLC materials will cause discrete modulation of polarized light, while cells having SmA* and other analog CSLC materials will cause analog modulation of polarized light.

Such homeotropic CSLC cells can be positioned between the reflective surfaces of FP, asymmetric FP and folded optical path cavities to provide modulators of the present invention. Reflective surfaces are positioned parallel to the substrate walls or perpendicular to those walls dependent on the choice of light path through the cell. Again the reflective surfaces are positioned with respect to the light path through the cell such that incident light substantially makes more than one pass through the CSLC cell for FP and folded optical path cavities before exiting. Two light passes through the cell being preferable for reflection-mode devices. An electric field is applied across the cell in order to rotate the optic axis of the aligned chiral smectic liquid crystal material in a plane perpendicular to the substrate walls and the direction of the applied electric field. Any chiral smectic liquid crystal material can be employed in a homeotropically-aligned cell. Homeotropically-aligned cells typically employ lateral electrodes which need not be transparent. The use of lateral electrodes is an advantage which decreases absorption losses in light intensity on passage through the cell.

Any means for reflecting light within the folded optical path and FP cavities can be employed in the modulators of this invention. The reflective means typically comprises a front and back reflective surfaces. The front reflective surface is that through which light enters the optical cavity. The reflective surfaces can include among others mirrors, deposited metal reflectors or mirrors, dielectric mirrors or functional equivalents thereof. The finesse of the etalon is dependent on the reflectivities ($R_{front}$ and $R_{back}$) Of the reflective surfaces. The reflectivities of both of the mirrors are preferably greater than about 0.85 for high finesse applications. FP cavities herein are operated in transmission/reflection mode. In transmission-reflection mode, both of the mirrors must be less than 100% reflective. The asymmetric FP cavities herein are operated in reflection-only mode. When employed in reflection-only mode, the $R_{back}$ surface has a reflectivity significantly higher than $R_{front}$.

Exemplary embodiments of the modulators of the present invention include FP cavity and asymmetric FP cavity in which the optical cavity is substantially within the CSLC cell and can be substantially coextensive with the aligned LC layer of an LC cell filled with a planar or homeotropically-aligned chiral smectic liquid crystal material. In these cases, the reflective surfaces forming the etalon are positioned, for example, at the inner surface of the substrate walls or laterally along opposing sides of the cell. Alignment layers can be provided between the reflective surface and the CSLC material. In cases in which the reflective surfaces are not employed as the electrodes, transparent electrodes can be provided. Alternatively, an isotropic spacer can be provided between the reflective surfaces to allow the cavity length to be changed. These optical cavities can also be provided with intracavity lenses which function to focus light reflected within the etalon cavity to minimize losses. In certain configurations, the etalons of the present invention include intracavity quarter-wave plates which function to transform linearly polarized light to circularly polarized light. Surface-stabilized, planar-aligned cells typically have chiral smectic liquid crystal layers of about 0.5 to 15 $\mu m$. Homeotropically-aligned cell can typically be more flexible in thickness ranging from about 0.25 to 250 $\mu m$ or greater. The choice of CSLC, cell alignment type and thickness of LC layer employed will depend on type of modulation desired and at least in part on the FSR (free spectral range) required for a particular modulator application. As is well-known, the FSR of an optical cavity will generally increase as the cavity length decreases.

In planar-aligned cells, an FP etalon cavity can be formed essentially by the placement of reflective surfaces on the inside surface of the substrate walls which form the chiral smectic liquid crystal cell. In such modulators, the reflective surface, for example a deposited metal mirror, may be employed as electrode or additionally transparent conductive electrodes may be provided with dielectric mirrors. In a possible device configuration, reflective conductive metal surfaces are deposited on the inner surfaces of the substrate walls of the cell, a planar alignment layer is applied over the reflective surfaces and a planar-aligned chiral smectic material is positioned between the substrate walls and thus, between the reflective surfaces and electrodes. In the case of planar-aligned SmC*, SmA* and antiferroelectric materials the cell must be surface-stabilized, as is known in the art. Surface stabilization is not required for planar-aligned distorted helix ferroelectric liquid crystal cells, as is known in the art.

A FP cavity filled with a planar-aligned, surface-stabilized, discrete state chiral smectic liquid crystal material, as exemplified by a binary state SmC* material, can operate as a discrete phase, intensity or wavelength modulator. In the case in which the tilt angle of the planar-aligned, surface-stabilized SmC* material is 45°, a transmission/reflection-mode FP modulator can function as a binary intensity modulator of monochromatic or coherent light. The contrast level of the modulator will depend on the reflectivities of the etalon mirrors. Higher contrast intensity modulation is achieved with higher mirror reflectivities. The same planar-aligned, surface-stabilized, binary state, 45° tilt angle SmC* material in a FP modulator can function as a binary filter of non-monochromatic or coherent light selecting between two transmission spectra, i.e., filter outputs. If the tilt angle of the SmC* material employed is less than 45°, monochromatic or coherent light will undergo intensity modulation and non-monochromatic light will undergo binary wavelength and intensity modulation. A reflection-only-mode asymmetric FP modulator having a planar-aligned, surface-stabilized 45° tilt angle SmC* material can function as a binary phase modulator of coherent light. Since the optic axis of the chiral smectic LC cells are rapidly rotatable, discrete tuning modulators employing such cells can be temporally multiplexed for applications to gray-scale and color generation employing slow response detectors, where slow response is with respect to the length of the periodic time integral of interest.

A transmission/reflection-mode FP cavity filled with a planar-aligned analog chiral smectic liquid crystal material, as exemplified by a surface-stabilized SmA* material or a non-surface-stabilized DHF material, can operate as an intensity modulator for monochromatic or coherent light or as a wavelength modulator for non-monochromatic or coherent light. A FP cavity filled with a planar-aligned DHF material can operate as an analog modulator of phase which would also exhibit a tilt angle dependent change in amplitude for coherent light and as an analog modulator of wavelength of non-monochromatic light exhibiting tilt angle dependent intensity modulation. An analog chiral smectic liquid crystal cell can be operated in a multi-discrete state mode and can be temporally multiplexed for applications employing slow response detectors.

In homeotropically-aligned cells, at least two device geometries are possible. The FP cavity can be formed by placement of the reflective surfaces at the inside surfaces of the substrate walls of the cell. Alternatively, the cavity can be formed by lateral positioning of the reflective surfaces. In either case, the cell requires lateral electrodes such that the applied electric field will be in the plane of the smectic layers. Light can enter the cell either through the substrate walls or through a side of the cell perpendicular to the lateral electrodes.

A FP cavity filled with a homeotropically-aligned discrete state chiral smectic liquid crystal material, as exemplified by a binary state SmC* material, can operate as a binary intensity or wavelength modulator. An asymmetric FP cavity having a homeotropically-aligned cell CSLC will function as a binary phase modulator of coherent light.

A FP cavity filled with a homeotropically-aligned analog chiral smectic liquid crystal material, as exemplified by a SmA* material, can operate as an analog phase modulator for coherent light, an analog intensity modulator of monochromatic or coherent light or an analog wavelength modulator of non-monochromatic light. An asymmetric FP cavity having a homeotropically-aligned CSLC cell will function as an analog phase modulator of coherent light. An analog chiral smectic liquid crystal cell can be operated in a multi-discrete state mode and can be temporally multiplexed for applications employing slow response detectors.

This invention provides FP cavity modulators and folded optical path modulators which are continuously tunable phase, intensity or wavelength modulators employing planar-aligned, analog chiral smectic liquid crystal cells, as exemplified by a surface-stabilized SmA* cell or a distorted helix ferroelectric cell. In these modulators, an intracavity quarter-wave plate means is employed in addition to an intracavity analog planar-aligned chiral smectic liquid crystal cell. The quarter-wave plate means is provided in order to transform linearly polarized light to circularly polarized light before it passes through and after it exits the CSLC layer.

A exemplary continuosly tunable FP intensity modulator of linearly polarized monochromatic or coherent light comprises within a FP cavity an analog, planar-aligned, chiral smectic liquid crystal cell which is a half-wave plate for the wavelength of incident light and quarter-wave plate means which is quarter-wave for the incident light. The half-wave plate and quarter-wave plate are positioned with respect to each other such that light entering the cavity passes through a quarter-wave plate before and after it passes through the liquid crystal cell half-wave plate. The optic axes of the quarter-wave plates are most preferably oriented at an angle of 45° with respect to the direction of polarization of linearly polarized light (E field vector of the light) entering the modulator. The same modulator will function as a continuously tunable wavelength modulator of non-monochromatic light. In the case of wavelength modulation of non-monochromatic light, the quarter-wave plate preferably functions as an achromatic quarter-wave plate over the wavelength range of interest. The CSLC half-wave plate also preferably functions as an achromatic half-wave plate over the wavelength region of interest. This modulator can be operated in the transmission-reflection mode. The reflectivities of both of the etalon mirrors are less than 1 and phase or wavelength modulation may be accompanied by losses in intensity dependent on the finesse of the cavity.

A continuously tunable folded optical path phase modulator of linearly polarized coherent light is a reflection-only mode (asymmetric FP) device which comprises within the optical cavity an analog, planar-aligned CSCL cell quarter-wave plate and a quarter-wave plate. The back reflective surface of the optical cavity is approximately 100% reflective. The quarter-wave plate is positioned between the front reflective surface and the CSLC cell and the optic axis of the quarter-wave plate is preferably oriented at 45° with respect to the direction of linearly polarized light entering the optical cavity in order to transform the linearly polarized light to circularly polarized light. Intensity losses are minimized in the reflection-only mode device.

In other exemplary modulator embodiments, the reflective surfaces which form the optical cavity are external to the CSLC cell and the optical cavity can optionally include more than one of such cells. Two or more of the same type of CSLC cell can be confined or two or more of different types of cells can be combined. Particularly useful combinations of CSLC cells within an optical cavity include cascaded planar-aligned, surface-stabilized SmA* cells (where $\Psi_{MAX}<45°$) to increase the total rotation of polarization of incident light preferably to 90° and combinations of DHF cells with similarly aligned SmA* or SmC* cells in which the SmA* or SmC* cell functions to compensate for the induced polarization of the DHF. Also useful are combinations of two (or more) DHF cells whose optical axes rotate in the same direction to compensate for the rotation of polarized light or that rotate in opposite directions to compensate for the change in birefringence. These cavities can also optionally be provided with an isotropic spacer between the reflective surfaces external to the chiral smectic liquid crystal cell(s) to allow the cavity length to be changed. These modulators can optionally be provided with intracavity lenses which function to focus light reflected within the cavity to minimize loss. Analog phase and wavelength modulators can be provided by incorporation of quarter-wave plates as described above.

Additional aspects of the present invention relate to non-etalon configurations of optical modulators which comprise planar-aligned analog CSLC cells and quarter-wave plate means which can function as variable retarders and analog phase modulators. A transmission mode variable retarder includes, for example, a SmA* or DHF cell capable of analog rotation of its optic axis on application of an electric field to the cell electrodes and two quarter-wave plates on either side of the CSLC cell such that light passes through a quarter-wave plate before entering and after exiting the cell. The CSLC cell has a layer thickness, such that the cell functions as a half-wave plate for the wavelength(s) of light to be modulated. In a general variable retarder, the optic axes of the quarter-wave plates are either parallel to or perpendicular to one another. An embodiment of a variable retarder functions with linearly polarized light and the optic axes of the quarter-wave plates are oriented at 0°, 45° or 90° with respect to the direction of polarization of the incident light. A specific embodiment of the variable retarder is a phase modulator in which the quarter-wave plates are oriented at 45° with respect to the polarization of the incident light. The modulator also provides analog intensity modulation of linearly polarized monochromatic or coherent light and analog wavelength modulation of linearly polarized non-monochromatic or coherent light. For use with non-monochromatic or coherent light, the quarter-wave plates are preferably achromatic. A reflection-mode variable retarder or phase modulator contains a single quarter-wave plate, an analog CSLC quarter-wave plate and a back reflective surface. A reflection mode modulator is a phase modulator of coherent light.

The modulators of the present invention are optically or electronically addressable in single pixels or arrays of multiple pixels. They can be electronically addressed employing, for example, overlapping electrode arrays using direct drive means, matrix addressing or multiplexing means. Electrodes can also be provided via integrated circuits of Si or GaAs, for example. They can be optically addressed by means of a photosensor, for example, a photodiode, photoconductor, or phototransistor, including, among others, thin film transitors including those made of Si or GaAs integrated circuits and multiple quantum wells or thin films of amorphous Si, CdSe and functional equivalents thereof.

This invention also provides methods of modulating the phase, intensity or wavelength of light, particularly elliptically polarized light and more particularly linearly polarized light, employing the resonance cavity modulators and non-resonance cavity modulators described herein.

BRIEF DESCRIPTION OF THE FIGURES

FIG. 3 is a two-dimensional, cross-sectional schematic view of an exemplary device configuration for a planar-aligned, chiral smectic LC switchable Fabry-Perot modulator.

FIG. 4 is a schematic representation of an exemplary homeotropically-aligned, lateral-electrode, smectic LC modulator. View A is a three-dimensional view of a side of the device and view B is a two-dimensional, cross-sectional view from the top of the device.

FIG. 5 are schematic representations of planar-aligned smectic LC analog optical modulator employing quarter-wave plates. View A is a transmission-mode modulator. View B is a reflection mode modulator.

FIG. 6 is a cross-sectional view of an exemplary device configuration for an analog Fabry-Perot intensity or wavelength modulator employing a planar-aligned chiral smectic liquid crystal layer.

FIG. 8 is a cross-sectional view of an exemplary device configuration for an analog chiral smectic liquid crystal phase modulator operating in reflection-mode and employing a planar-aligned chiral smectic liquid crystal layer.

FIG. 10 is a cross-sectional view of an exemplary application of the modulator of FIG. 5A of the present invention in an optically addressable transmission mode single pass spatial light modulator.

FIG. 11 is cross-sectional view of an exemplary application of phase modulators of the present invention in an optically addressable reflection mode elation spatial light modulator.

FIG. 15 is a exemplary application configuration for an analog transmission-reflection mode modulator of the present invention.

DETAILED DESCRIPTION OF THE PREFERRED EMBODIMENTS

Figure 1:
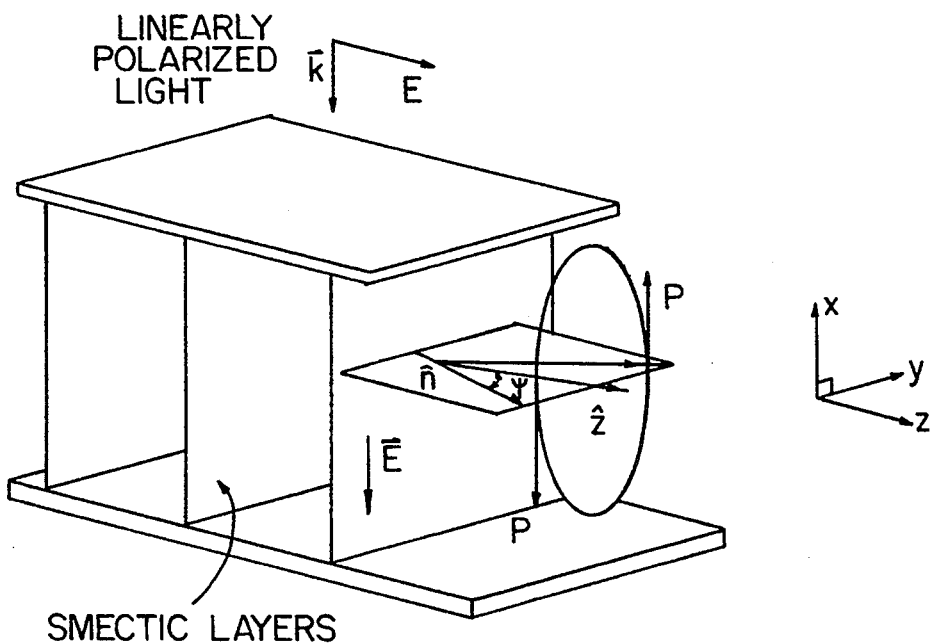
FIG. 1 is an illustration of planar alignment of chiral smectic liquid crystal cells.

The term chiral smectic liquid crystal (CSLC) cell is used generally herein to refer to transparent or semi-transparent cells or light switches containing a chiral smectic liquid crystal material which functions on application of an electric field to cell electrodes to rotate the polarization of light passing through the cell. Cells are typically formed of uniformly-spaced transparent or semi-transparent retaining walls of an inert substrate, such as glass or quartz. A conducting material is typically coated on the inside surface of the substrate walls to provide transparent or semi-transparent electrodes. A chiral nonracemic smectic liquid crystal composition, often a mixture of components, is inserted between the uniformly-space transparent electrodes. A method of alignment of the ferroelectric liquid crystal molecules within the cell is typically employed. One preferred alignment is the "bookshelf" alignment which has been described by Clark and Lagerwall, supra. A schematic diagram of a planar-aligned CSLC is provided in FIG. 1. Smectic layers are aligned perpendicular to the substrate walls which bound the LC layer. The molecular director $\hat{n}$ makes an angle $\Psi$ to the smectic layer normal ($\hat{z}$). The molecular director is the average direction of the long axis of the molecule in the layer. Surface stabilization suppresses the formation of a helix within the material so that the optic axis is confined to rotate in a plane (yz in FIG. 1). Surface stabilization is required for SmC* and SmA* planar-aligned cells. In a discrete, multi-state FLC cell, for example a bistable FLC cell like a SmC* SSFLC cell, application of an appropriate electric field to the cell electrodes can allow selection between states. The discrete states of the cell are associated with orientations of the chiral smectic LC molecules within the cell on application of the electric field. For example, application of a voltage, above a certain threshold voltage, to the cell electrodes result in switching of the orientation of the chiral smectic LC molecules. Bistable cells have two such orientations. Tristable cells have three such orientations. With a multistable state LC cell, a voltage need not be applied to maintain the orientation of the CSLC molecules which defines the state of the cell. In a CSLC cell that does not have stable states, it may be necessary to apply a voltage to maintain the cell in the desired switching state. The optic axis of a planar-aligned CSLC cell is in the plane of the substrate walls of the cell which form the aperture of the cell through which light enters the cell.

Analog CSLC materials for example SmA* electroclinic materials and DHF materials, when incorporated into FLC cells and aligned in a planar or bookshelf geometry display an analog rotation of the cell optic axis with applied electric field. The maximum rotation angle that can be obtained is twice the maximum tilt angle ($\Psi_{MAX}$) of the electroclinic or DHF material employed in the cell. Analog FLC cells can be operated in a multi-state mode by appropriate application of an electric field to the cell electrodes. DHF materials in addition to the field dependent rotation of the optic axis, display a voltage dependent change in birefringence ($\delta\Delta n$).

Figure 2:
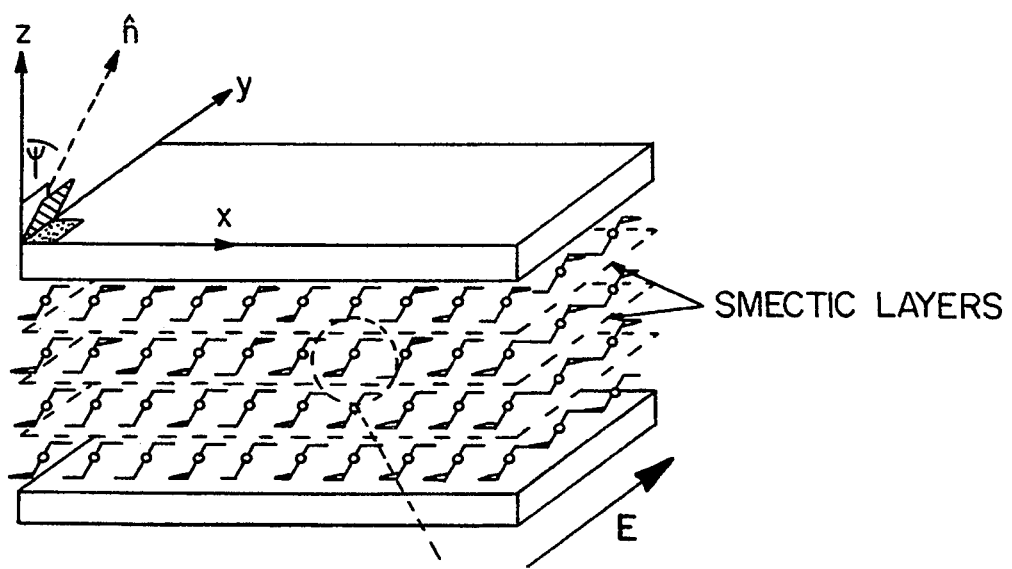
FIG. 2 is an illustration of homeotropic alignment of chiral smectic liquid crystal cells.
Figure 2:
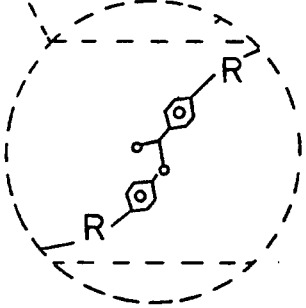

Homeotropic alignment as employed herein refers to alignment of CSLC materials as described in FIG. 2. Homeotropic alignment refers to CSLC alignment in which the smectic layers are parallel to the substrate walls (which in this case may or may not be the aperture of the cell). The electric field is applied to such a cell across the smectic layers, i.e., parallel to the layers (e.g., in the xy plane as indicated in FIG. 2) by electrodes that are lateral to the substrate walls. The layer normal is $\hat{z}$. The liquid crystal molecules are aligned with respect to each other within the smectic layers by application of an aligning electric field during cell preparation as is well-known in the art. The molecular director ($\hat{n}$) makes an angle $\Psi$ with respect to $\hat{z}$, as indicated in FIG. 2. Application of an electric field along y as indicated, rotates $\hat{n}$ in the xz plane. In this case, light entering through the substrate walls, particularly linearly polarized light propagating along z (with $\bar{k}$ along z) with $\bar{E}$, along x will be modulated. Light entering the exemplified cell laterally through the zy plane, particularly linearly polarized light propagating along x (with $\bar{k}$ along x) and $\bar{E}$ along z will be modulated. Application of an electric field along x results in rotation of $\hat{n}$ in the zy plane results in modulation of linearly polarized light with $\bar{k}$ along y and $\bar{E}$ along z or $\bar{k}$ along z and $\bar{E}$ along y.

The terms "transmission mode" and "reflection mode," as applied to single-pass and multi-pass modulators, and transmission-reflection mode and reflection-only mode, as applied to multi-pass modulators, refer generally to the light path through the modulator. In a transmission-mode, single-pass modulator, light exits the device after a single pass through a CSLC cell without being reflected back. In a reflection-mode, single-pass modulator, light exits the device after two passes through a CSLC cell, light is ideally fully back reflected by a reflective surface with R ideally equal to 1. When the terms transmission mode or reflection mode are used in reference to a multi-pass FP cavity device, they refer to the light path in the transmission/reflection mode modulator where the reflectivities of both reflective surfaces, which form the optical cavity, are less than 1. In either case, light exits the device after multiple passes through the CSLC cell. In a transmission/reflection-mode, multi-pass modulator, the reflection mode output is related to the transmission output by the well-known relationship $T = 1 - R$ where R is reflectance. In a reflection-only mode modulator, ideally all of the incident light is back reflected after multiple passes through a CSLC cell so that there is ideally no intensity loss. The back reflective surface of a multipass, reflection-only mode modulator ideally has reflectivity $(R_B) = 1$. No reflective surface will, however, have an ideal reflectivity of 1.0. For reflection-only mode devices, the back reflective surfaces preferably have a reflectivity $(R_B)$ of approximately 1. In reflection-only mode devices the reflectivity of the back reflective surface must be higher than that of the front reflective surface. The choice of reflective surfaces in transmission/reflection-mode device depends on the desired finesse of the modulator. For purposes of this application, high reflectivity refers to reflectivities of about 0.85 or higher. The choice of relative reflectivities of the reflective surfaces of an optical cavity for obtaining transmission/reflection or reflection-only operation and for obtaining a desired finesse is understood by those of ordinary skill in the art.

The terms optical cavity and resonance cavity are used interchangeable in this application. An etalon is a resonance cavity which typically has fixed reflective surfaces separated by a fixed distance L. An FP etalon typically refers to a transmission/reflection mode etalon where both reflective surfaces have reflectivity less than 1. An asymmetric FP etalon, also called a Gires-Tournois etalon (or cavity) (see Yariv et al. (1984) supra p. 291) refers to a reflection-only mode etalon where one of the reflective surfaces has a reflectivity ideally equal to 1. The FP etalon (and interferometers) and asymmetric FP etalons (and interferometers) are, in most general terms, called folded optical path devices. A reflection mode, single-pass device is also a folded optical path device. The term FP cavity is used herein to refer to symmetric and asymmetric etalons and interferometers.

In the present invention the term polarizer is used to refer to any device or device element which separates incident light into orthogonal polarizations and can include among others: polarizing beam splitters, Wollaston prisms, etc. An entrance polarizer defines the polarization of light entering a light modulator or switch. An exit polarizer or polarization analyzer is any device or device element that can be employed to analyze the polarization of light exiting a light modulator or switch.

Table 1 provides a summary of exemplary multi-pass optical modulator configurations of the present invention. Exemplified configurations include one or more CSLC cells in series within optical cavities. In some configurations birefringent elements such as quarter-wave plates are included within the resonance cavity. When CSLC cells are combined in series, they can be configured by choice of application of electric field or by choice of CSLC material so that their optic axes rotate in the same or opposite directions.

Detailed descriptions are given below for exemplary device configurations arising out of the present invention.

I. Planar Aligned Smectic Liquid Crystal Fabry-Perot Modulators

A. Binary Fabry-Perot Modulators

FIG. 3 is a schematic cross-sectional diagram of an exemplary Fabry-Perot etalon which incorporates a planar- or bookshelf-aligned chiral smectic LC material (see FIG. 1) and which selects between two transmission outputs corresponding to the two extremes of an electric field applied across the smectic layer. The device can employ a discrete state chiral smectic LC material, such as a SmC* material, or an analog smectic LC material, such as a SmA* material. The modulator can be employed in the transmission/reflection mode. An analogous folded optical path structure, also called an asymmetric Fabry-Perot cavity can be operated in the reflection-only mode. In either case, the device can select between two spectral, i.e., wavelength and/or intensity, outputs or modulate phase, dependent on the light entering the etalon and whether the device is operated in the transmission/reflection mode or reflection-only mode. The FP etalon device, operated in the transmission/reflection mode with linearly polarized, monochromatic or coherent light, modulates intensity and with linearly polarized, non-monochromatic, incoherent light, e.g., white light, the etalon modulates wavelength. The reflection-only mode device with coherent light modulates phase. These devices can, thus, function as either a binary wavelength filter and a binary intensity modulator, i.e., an on/off light switch, or a binary phase modulator. Wavelength, intensity and phase modulation by these devices do not require the use of an output or analyzer polarizer.

In a planar-aligned, surface-stabilized chiral smectic LC, the molecular director of the material rotates in the plane of the electrodes, the yz plane, on application of an electric field across the electrodes, as shown in FIG. 1. The direction of rotation of the optic axis depends on the sign of the applied field. In a two state FLC material, a SmC* material, two orientation of the optic axis are possible. In such a material the optic axis is rotated by an angle $2\Psi$, where $\Psi$ is the intrinsic tilt angle of the FLC material, by application of a threshold electric field. In a material having a tilt angle of 45°, the optic axis can be rotated by a total of 90°. In order to obtain maximal light modulation, light entering the device must be linearly polarized with the plane of vibration of entering light perpendicular to the plane of the substrate walls and electrodes. In this case, the incident light is oriented along the extraordinary axis and sees $n_e$. During operation of the planar-aligned CSLC cell, rotation of the optic axis does not effect a change in birefringence of the CSLC material.

The device of FIG. 3 comprises a chiral smectic LC cell containing a planar-aligned layer of an smectic LC material, 31, between inert substrate walls 32 and 33. When SmC*, or SmA* FLC layers are employed, the layers are also surface-stabilized to disrupt helix formation. The device view provided in FIG. 3 is a cross-sectional view in the xz plane, as indicated, where the z direction is the direction of the normal to the planar-aligned smectic layers (ẑ). The inside surfaces of the substrate walls (yz plane) are provided with apposed internal reflective surfaces 34 and 35. The internal surface of the substrate walls are also provided with electrodes, 36 and 37, which may be the reflective surfaces or separated transparent conducting electrodes, e.g., ITO electrodes. The internal surfaces of the reflective surface may be provided with appropriate alignment layers (38, 39) to assist in obtaining planar-alignment of the chiral smectic LC. The substrate walls form a uniformly spaced resonance cavity of length, L, between the internal reflective surfaces. In FIG. 3, L is substantially equal to the thickness of the CSLC layer (d). The device can, optionally, include an isotropic spacer such that L is greater than d. The device can, again optionally include means for spacing the substrate walls (not shown in FIG. 3). A means, for applying an electric field or voltage across the electrodes, 36 and 37, is also provided.

The device of FIG. 3 can be operated in transmission/reflection mode or reflection-only mode. When operated in the transmission/reflection mode, the substrate walls, any electrodes, and alignment layers are preferably transparent or semi-transparent to light entering the modulator. At least one of the reflective surfaces must be transmissive to light entering the resonance cavity. The substrate walls can be constructed, for example, from glass plates. A reflective surface can, for example, be deposited by conventional means on the glass substrate to obtain a surface of the desired reflectivity. For example, aluminum mirrors can be deposited. Alternatively, dielectric mirrors can be employed. If the reflective surfaces are formed by metal deposition, the mirrors can also function as the electrodes. Alternatively, a transparent electrode layer, for example of tin oxide or indium tin oxide, can be provided. An alignment layer of an FLC alignment promoting material, for example PBT, can optionally be provided as the final layer on the inside surfaces of the substrate walls (38 and 39). Alignment layers which promote the desired bookshelf or planar geometry are well-know in the art. After the substrate walls are prepared, the cell can be gaped using spacers, the chiral smectic LC material is introduced between the spaced walls and aligned within the resultant resonance cavity.

When operated in the reflection-only mode, the device has an asymmetric FP cavity in which the reflectivity of one of the reflective surfaces (i.e., the back reflective surface) is approximately 1, and only one of the substrate walls with electrode need be transparent or semi-transparent.

The operation of a typical binary intensity modulator of FIG. 3, incorporating a planar-aligned, surface-stabilized SmC* with a tilt angle of 45° is described. A commercially available material, designated Chisso 2004, (Chisso, Japan), is an example of a SmC* FLC mixture with a tilt angle of 45°. Such a material is positioned and aligned in the cavity (31). Other such high tilt materials are known in the art. Reversing the polarity of the applied electric field across the cell rotates the optic axis of the device by 90°. The SmC* material, on such a configuration, displays either of two molecular orientations which coincide with the two possible orientations of the optic axis at ±Ψ in the yz plane. The material has two states dependent on the sign of the electric field. Linearly polarized monochromatic or coherent light enters the etalon. The entering light is propagated along the x axis and preferably polarized parallel to the optic axis of the smectic LC in one of its switching states.

Entering light with polarization parallel, for example, to the extraordinary axis of the device excites the extraordinary eigenmode of propagation. Transmission through the device, neglecting absorption losses from the mirrors and scattering losses in the FLC material, is given by:

$$T(\lambda) = \frac{(1-R_1)(1-R_2)}{(1-R_1R_2)^2 + 4\sqrt{R_1R_2}\sin^2[\delta/2]}, \quad (1)$$

(see Yariv et al. (1984) *Optical Waves in Crystals*, Chapter 8, John Wiley and Sons, New York) where $R_1$ and $R_2$ are the reflectivities of the reflective surfaces of the etalon, $\delta$ is the phase change due to a single round-trip of light of wavelength $\lambda$, in a cavity of index of refraction n and thickness L. L is the separation between the mirrors in the etalon. Assuming normal incident light, $\delta$ is given by $$\delta = \frac{4\pi n L}{\lambda}. \quad (2)$$

When monochromatic or coherent light is incident on the etalon of FIG. 3 in transmission/reflection mode and the tilt angle of the FLC mixture is 45°, the device functions as an intensity modulator, an on/off switch, since little or no light is transmitted through the etalon when the optic axis of the SmC* LC is rotated perpendicular to the polarization of incident light. Depending on the values of $R_1$ and $R_2$ and any device losses, the device will function as a high or low contrast intensity modulator. An output polarizer is not required to detect the intensity modulation produced by this device.

The operation of a typical binary wavelength modulator of FIG. 3, incorporating a planar-aligned, surface-stabilized SmC* material having tilt angle of 45° is also described. This device is identical to structure to the binary phase modulator above. Light entering the device is, however, non-monochromatic, linearly polarized light.

According to Equation 1, in an etalon like that of FIG. 3, a transmission maximum occurs for $$\delta/2 = m\pi, \quad (3)$$

where m is the order of the resonance of the cavity. Because the tilt angle of the molecular director of the SmC* LC material is 45°, the input light can be linearly polarized either along the ordinary or extraordinary axis, depending upon the sign of the applied electric field. Switching the FLC cell by, for example, reversing the applied electric field, switches the index of refraction seen by the incident light from $n_e$, to $n_o$. This changes the effective optical path length of the cavity, thereby shifting the resonance frequencies of the cavity. When incident light is polarized along the ordinary axis, a transmission maximum occurs for wavelengths $$\lambda_o = \frac{2n_o L}{m}, \quad (4)$$

where $n_o$ is the ordinary index of refraction and $\lambda_o$ is the wavelength corresponding to the $m^{th}$ resonance of the cavity in one switched state of the FLC. Upon switching the device, the incident light is polarized along the molecular director giving the following condition for transmission maxima $$\lambda_e = \frac{2n_e L}{l}, \quad (5)$$

where $n_e$ is the extraordinary index of refraction and $\lambda_e$ is the wavelength corresponding to the $l^{th}$ resonance of the cavity in the second switched state of the FLC.

In the ordinary transmission, $(\Delta\lambda = \lambda_{-1} - \lambda_o)$:

$$\lambda_o = \frac{2n_o L}{m} \text{ and } \lambda_{-1} = \frac{2n_o L}{(m-1)}, \quad (6)$$

is the ordinary FSR between those wavelengths and can be written as:

$$\Delta\lambda = \frac{\lambda_o^2/[2n_o L]}{1 - (\lambda_o/[2n_o L])}. \quad (7)$$

The difference in wavelength between two maxima in the ordinary transmission and the extraordinary transmission at the same resonance value, i.e., $m = 1$ $(\delta\lambda = \lambda_e - \lambda_o)$ is:

$$\delta\lambda = \frac{\Delta n}{n_o}\lambda_o, \quad (8)$$

where $\Delta n$ is the difference in extraordinary and ordinary indices of refraction, i.e., the birefringence $(n_e - n_o)$ of the material at wavelength $\lambda_o$.

Wavelength tuning of the device between two adjacent maxima of the ordinary and extraordinary transmissions is accomplished by reversing the polarity of the electric field applied across the FLC layer. Tuning of the device results in shifts between the ordinary and extraordinary transmissions within a the Free Spectral Range (FSR) of the device, and the tuning range can be written as a fraction of the ordinary FSR as $$\frac{\delta\lambda}{\Delta\lambda} = \frac{\Delta n}{n_o}\left|\frac{2n_o L}{\lambda_o} - 1\right|. \quad (9)$$

Note that L and the FLC material (actually $n_e$ and $n_o$, of the material) are chosen so that at the design wavelength the FSR between adjacent etalon resonance maxima is larger than the $\delta\lambda$ over which tuning is desired.

If for example, it is desired to tune the device by one half of an FSR from a design wavelength of 630 nm, with an FLC having $\Delta n = 0.15$ and $n_o = 1.5$, the resonance cavity width L should be set at 1.26° µm. Under these conditions, with incident white light and appropriate blocking filters, the device will transmit a series of maxima in the visible wavelength region (ordinary) at approximately 756, 630, 540, 473, and 420 nm and on switching of the applied electric field will transmit a second series (extraordinary) of maxima in the visible at approximately 832, 693, 594, 520, 462, and 416 nm. The etalon can, thus, function as a binary filter to select between adjacent wavelengths in the ordinary and extraordinary transmission series. One or more blocking filters external to the etalon can be employed to block higher or lower order maxima.

As a second example, if it is desired to select between bands centered at about 600 and about 700 nm, from incident white light, an FLC etalon can be designed with a high tilt 45° SmC* FLC material having $n_o = 1.5$ and $\Delta n = 0.25$ and spacing the etalon cavity at 1.0 µm. In one state such an etalon will transmit maxima (in the visible) at approximately 750, 600, 500 and 428 nm and in the other state maxima at approximately 875, 700, 583, 500, and 437 nm. Note that this etalon can also select between wavelength pairs: 875 and 750 nm, 750 and 700 nm, and 600 and 583 nm. The etalon cannot select 500 nm light, since a 500 nm band is transmitted in both states of the device. With the use of appropriate blocking filters external to the etalon, reversing the polarity of the electric field in such an etalon will allow selection between the desired pairs of wavelengths.

The contrast of intensity and wavelength modulation of the binary etalon of FIG. 3 will decrease if a SmC* material having a tilt angle $\neq 45°$ is employed. This is illustrated by the following example. In a binary etalon wavelength modulator of FIG. 3, in which a SmC* material having a tilt angle of 22.5° is employed, the optic axis of the etalon will rotate by 45° when the electric field applied to the device is reversed. If in one state of the device, corresponding to one polarity of applied field the incident non-monochromatic light is polarized along the extraordinary axis, the device will transmit a series of maxima at wavelengths, $\lambda_e = 2n_o L/m$. When the polarity of the electric field is reversed, the optic axis of the FLC is rotated by 45°. In this case, two eigenmodes of propagation are excited within the cavity: one oriented along the optic axis and one oriented perpendicular to the optic axis. In this case, two series of wavelength maxima $\lambda_o$ and $\lambda_e$, of comparable intensity, where $\lambda_o = 2n_o L/m$ and $\lambda_e = 2n_e L/m$, will be transmitted. The relative intensities of the two series of bands transmitted will depend on the tilt angle. For the extraordinary transmission neglecting losses, the intensity $E_e = E_{inc}\cos 2\Psi$ and for the ordinary transmission, the intensity $E_o = E_{inc}\sin 2\Psi$, where $E_{inc}$ is the incident light intensity. At $2\Psi = 45°$ $E_o = E_e$. At $2\Psi$ less than 45°, $E_o > E_e$. At $2\Psi$ greater than 45°, $E_o < E_e$.

Analog chiral smectic LC materials, such as SmA* materials, display a voltage dependent analog rotation of tilt angle from the field free state where $\Psi = 0°$ to a maximum voltage dependent $\Psi_{MAX}$. The use of such an analog material (planar-aligned and surface-stabilized) in the device of FIG. 3 will result in analog intensity modulation of monochromatic or coherent light when operated in transmission/reflection mode. However, non-monochromatic or coherent light will undergo binary/wavelength modulation with the etalon between two transmission series of maxima dependent on L and the refractive indices of the material. Most known SmA* materials have maximum tilt angles of 22.5° or less. Thus, a typical SmA* etalon of FIG. 3 will select between the extraordinary transmission maxima ($\lambda_e$) and the transmission of both the ordinary and extraordinary transmissions ($\lambda_e$ and $\lambda_o$). A SmA*-based etalon functions similarly to the etalon employing a SmC* material where $\Psi = 45°$ in that the relative intensities of the ordinary and extraordinary transmissions will vary as indicated above as a function of $2\Psi$.

When monochromatic spatial coherent light is incident on the device of FIG. 3 employing a SmA* FLC, the device operates like an analog amplitude, i.e., intensity, modulator. With this material the tilt angle rotates in linear proportion to the applied electric field. The light available to be resonantly reflected or transmitted is given by, $$E_1 = E_{inc}\cos(2\Psi(V)) \tag{10}$$

where V is the applied voltage and $2\Psi$ is the rotation of the optic axis, referenced to the direction of incident polarization. Varying the applied voltage V, varies $\Psi$, and thus varies the amplitude $E_1$. When $\Psi$ is oriented parallel to the incident polarization, $\Psi = 0°$ at $V_0$, incident light will be transmitted. When $\Psi$ is rotated to $\Psi(V)$ by changing the applied field, a phase shift is induced between the $\Psi = 0°$ state and any of the $\Psi(V)$ states. Hence for monochromatic or coherent light, the device in transmission/reflection mode operates like an analog amplitude, binary phase modulator.

In certain applications in which a detector which averages the wavelength output of the device, such as the human eye, is employed, the etalons of FIG. 3 which employ materials with tilt angle less than 45°, will allow selection between a pure spectral output at $\lambda_e$ (at some m) and combined outputs $\lambda_e + \lambda_o$. These two outputs will be perceived by the averaging detector as two distinct wavelengths. For example, for an etalon functioning in the visible region, the human eye would perceive two different colors, the second being a linear combination of $\lambda_o$ and $\lambda_e$. The relative intensities of the two wavelengths in the transmission will be a function of the tilt angle, so that some wavelength variation will be perceived by the averaging detector as a function of tilt angle.

Antiferroelectric liquid crystal materials can be employed in the devices of FIG. 3 in place of SmC* materials and function analogously to the SmC* materials. If a rotation of the optical axis of 90° can be achieved by switching between any of the states of the antiferroelectric material, then a high contrast binary wavelength modulator which modulates incident linearly polarized non-monochromatic light between two pure wavelengths will result. Similarly, a binary phase modulator will result when such a material is included in a reflection-only mode device of FIG. 3. If the optic axis of the material can rotate only by less than (or more than) 90°, then the wavelength modulator will display contrast that is dependent on the tilt angle of the material and will modulate between a pure wavelength and a linear combination of two wavelengths. Again analogous to the amplitude modulating etalons implemented with SmC* materials, those implemented with discretely switching multiple state materials can function as on/off light switches or multiple level amplitude modulators.

Certain FLC materials, such as distorted helix effect FLCs (DHF), when placed in a planar aligned cell, not only display a linear rotation of the optic axis as a function of the voltage applied to the electrodes, they also display a voltage dependent change in the birefringence ($\delta(\Delta n)$). These materials are also of interest because they operate at much lower voltage (the voltage saturates at $\pm 3$ V/$\mu$m compared to $\pm 15$–50 V/$\mu$m) than SmC*, SmA* or antiferroelectric (see below) materials and the tilt angles are relatively large $\pm 34°$. A device of FIG. 3, operated in transmission-reflection mode which incorporates a planar-aligned DHF material operates as a binary modulator of intensity (monochromatic or coherent light) or a binary modulator of wavelength (non-monochromatic light and tilt angle=45°) and a coupled wavelength/intensity modulator of non-monochromatic light as described above for SmA* materials angle$\neq$45°.

In the device illustrated in FIG. 3, the length d of the resonance cavity of the etalon is approximately equal to the width of smectic LC layer, typically designated L. Functional etalons can also have L$\neq$d. For example, etalons with L<d can be constructed by introducing one or more isotropic spacers along the light propagation axis between the reflective surfaces and the smectic LC layer. Functional planar-aligned, surface-stabilized FLC cells can be made with cell widths, L, ranging from about 0.5 to about 15 micron. The upper limit is presently determined by the limits of surface stabilization. The thinness of the cell is typically determined as the minimal thickness required to avoid shorting of the electrodes. Resonance cavity lengths greater than about 15 microns can be obtained by using isotropic spacers. CSLC cell etalons having L>d and L<d will function in the modulators of this invention.

II. Homeotropically Aligned Smectic Liquid Crystals Fabry-Perot Modulators

Continuously tunable Fabry-Perot etalon optical modulators are also provided herein. In one aspect, a continuously tunable modulation results from positioning of a homeotropically-aligned chiral smectic LC between etalon reflectors. Homeotropic alignment is illustrated in FIG. 2.

The homeotropic CSLC cell alignment of FIG. 2 is believed to be distinguished from prior art homeotropically-aligned CSLC configurations in that the electric field is applied across the smectic layer, perpendicular to the layer normal. This cell configuration provides very rapid binary or analog variation of the birefringence of the LC material. Light entering the cell through the substrate walls propagating along the z axis, referring to FIG. 2, sees this change in birefringence. The optical path through the cell is effectively changed when the birefringence of the material is changed. In an alternate homeotropic cell configuration, polarized light enters the cell, propagating along the y axis, bisecting the plane of the smectic layers.

CSLC cells having homeotropic alignment as displayed in FIG. 2 and relative positioning of electrodes, substrate walls and smectic layers as described in relation to FIG. 2 can function as light modulators in simple transmission-mode or reflection-mode. A homeotropically-aligned SmC* cell can function as a binary phase modulator or a binary wavelength modulator. A homeotropically aligned antiferroelectric cell can function as a ternary phase and wavelength modulator. A homeotropically aligned SmA* or DHF cell can function as an analog phase or wavelength modulator. Homeotropically-aligned CSLC cells can also function as intensity modulators.

These homeotropic cell configurations can be positioned with etalon and asymmetric etalon cavities to provide optical modulators of the present invention.

FIG. 4 provides a schematic illustration of a homeotropically-aligned smectic LC modulator. FIG. 4A is a three-dimensional side view of such an etalon modulator. The elements of this modulator are similar to those of FIG. 3 except for the relative positioning of electrodes in the devices. FIG. 4B is a two-dimensional cross-section of the device given to illustrate the position of the electrodes with respect to the substrate walls and smectic LC layer. In FIG. 4, a homeotropically-aligned LC layer (40) is positioned between substrate walls (47 and 48) and reflective surfaces (41 and 42). Lateral electrodes are positioned at the side of the cell (43 and 44). Optional alignment layers are provided (45 and 46). The positioning of these electrodes is more clearly seen by reference to View B. Homeotropic alignment is defined with respect to the substrate walls through which light enters the device. Thus, the smectic layers of the homeotropic layer of the illustrated device are in the yx plane. The layer normal $\hat{z}$ is along the z axis. Application of an electric field to the electrodes across the LC layer results in rotation of the optic axis of the liquid crystal in the yz plane.

An attractive feature of the device configuration of FIG. 4 is that light propagating through the device need not interact with the electrodes, precluding cavity absorption thereby permitting high-resolution transmission. The homeotropic cell configuration of the invention is an improvement over the conventional book-shelf geometry alignment in that a small percentage of incident light is absorbed by even the most transparent electrodes such as tin oxide or indium tin oxide commonly used with book-shelf type alignment. Therefore, the electrodes employed with homeotropic alignment can be opaque. They can also serve as spacers to create a bias phase inside the resonance cavity for providing greater filter selectivity.

The operation of the modulator of FIG. 4 is described for modulation of linearly polarized light as follows. Polarized light traverses the cell as indicated. An electric field of suitable strength applied to the cell electrodes triggers a rotation of the smectic LC optic axis. This rotation results in a change in birefringence of the material along the direction of light propagation and results in modulation of the light. The reflective surfaces of the device serve to fold and lengthen the optical path.

In a homeotropically aligned cell, the phase and retardation of the device can be modulated in an analog manner with an applied electric field. For a uniaxial anisotropic material, the index ellipsoid is used to give the two indexes of refraction seen by an incident optical field. For a positive uniaxial material, the semi-major axis of the ellipsoid corresponds to the extraordinary index of refraction, $n_e$ (along the direction), and the semi-minor axis gives the ordinary index of refraction $n_o$. Here, the slice of the index ellipsoid containing the incident optical polarization determines the birefringence. For propagation along the major axis of the ellipsoid (the directors), the slice is a circle. Therefore, the material appears isotropic $\Delta n = 0$. Propagation normal to the major axis yields the maximum birefringence, given by the anisotropy of the material $\Delta n = (n_e - n_o)$. For propagation at an angle $\theta$ to the major axis, which is intermediate to these two extremes, the two refractive indices seen by the optical field are $n_o$ and, $$n_e(\theta) = \frac{n_o n_e}{[n_e^2 \cos^2\theta + n_o^2 \sin^2\theta]^{\frac{1}{2}}} \tag{11}$$

Modulation of phase or retardation, depending upon the mode in which the device is used, is achieved by electronically varying the orientation of the director, $\theta$. Phase modulation is achieved by linearly polarizing the input field along the variable projection of the extraordinary index, $n_e(\theta)$. This phase modulation can be used in an optical cavity to change in an analog manner the resonance condition. The wavelength transmitted by a Fabry-Perot cavity of length L, corresponding to the $m^{th}$ resonance is given by $$\lambda = \frac{2n_e(\theta)L}{m} \tag{12}$$

The wavelength shift in changing the tilt angle from $\theta_1$ to angle $\theta_2$ is therefore given by $$\delta\pi\lambda = 2\frac{L}{m}[n_e(\theta_2) - n_e(\theta_1)] \tag{13}$$

For a full $\pi/2$ rotation of the director orientation, the maximum wavelength shift of $\delta\lambda_{MAX} = 2\Delta n \, L/m$ is achieved.

When an analog SmA* or DHF material is homeotropically-aligned in the modulator of FIG. 4, and operated in the transmission/reflection mode, an analog intensity or wavelength modulator results. When configured as an asymmetric FP operated in the reflection-only mode, an analog phase modulator results. Inclusion of discrete homeotropically aligned chiral smectic LC materials in the device of FIG. 4, results in discrete state intensity or wavelength modulators. When a discrete state CSLC material is configured as an assymetric FP operated in reflection-only mode, a discrete phase modulator results.

Means for obtaining homeotropic alignment are well-known in the art. For example, cetyltrimethyl ammonium bromide can be used as a homeotropic alignment agent. Homeotropically-aligned cells have been fabricated with thickness ranging between 0.25 to 250 $\mu$m or greater. Very thin cells, down to about 0.1 $\mu$m, can be produced to accommodate designs requiring small cavity length for accomplishing wider free spectral ranges (FSR's) due to the use of lateral electrodes. The device FSR is given by the square of the wavelength, propagating through the cavity divided by twice the index of refraction, n, of the FLC times the thickness, 1, of the FLC cell. The thickness, d, of the FLC cell, in the absence os a spacer, determines the device FSR. For a typically smectic LC cell n=1.5, and d=10 $\mu$m, an FSR of 80 nm can be obtained $\lambda$ (wavelength of interest for communications applications)=1.5 $\mu$m. A decrease in the cell thickness d to 1 $\mu$m results in an increase in FSR to 800 nm. The finesse, or the number of independent full width, half maximum peaks capable of being stored in the cavity, is a function of the mirror reflectivity. Hence, given a FSR and cavity finesse, the number of independent communication channels that can be demultiplexed, for example, is determined.

III. Continuously Tunably Planar-Aligned Chiral Smectic LC Optical Modulators

In fabricating high diffraction efficiency programmable optical elements, it is desirable to have a high resolution spatial light modulator (<1 $\mu$m) in which the phase of a particular pixel can be changed continuously between 0 and $2\pi$. A substantial phase change resulting from a relatively small induced phase shift can be obtained, through phase interference, by means of a resonance cavity. However, for certain applications, it is important that there be no change in the state of polarization of the light beam as it is being reflected off the cavity mirrors.

As has been discussed above, electro-optically tunable binary and analog smectic liquid crystal materials exhibit little or no birefringence change with an applied electric field, when they are aligned in the planar geometry. An electric field applied across the substrate walls effects only a rotation, within the plane of those walls, of the molecular director about the axis normal to the smectic layers. In other words, in a planar aligned smectic FLC, the phase change resulting from passage of a linearly polarized optical beam through a smectic LC layer is necessarily accompanied by a change in the state of polarization of that beam.

Therefore, a method of inducing a phase change of an optical beam through a smectic LC layer, without a change in the state of polarization, would have application in electro-optic modulation. The "decoupling" of phase change and rotation of the polarization can be accomplished with the smectic LC phase modulator schematically described in FIG. 5. This device configuration, represented in the transmission mode in FIG. 5A positions an analog planar-aligned chiral smectic LC cell half-wave plate (50), e.g., a SmA* or DHF cell, between two quarter-wave plates (51 and 52). The smectic LC cell (50) comprises transparent or semi-transparent substrate walls, transparent electrodes and optional alignment layers (not represented). The width of the LC layer in the cell is chosen so that the cell is a half-wave plate for the wavelength(s) to be modulated.

A basic principle for optical modulation with this device is that conversion of incident linearly polarized light to circular states of polarization via the quarter-wave plate allows the induction of an absolute phase retardation through a smectic LC half-wave plate, without a change in the state of polarization. Passage through the second quarter-wave plate reconverts the circularly polarized light to linearly polarized light. The resulting phase shift is a function of the orientation of the half-wave plate with respect to the direction of polarization of incident light and is, thus, a function of the voltage (or electric field) dependent tilt angle of the smectic LC material. Voltage dependent rotation of the optic axis of the smectic LC produces an analog change in phase which in a Fabry-Perot operated in transmission mode results in analog modulation of intensity of incident coherent monochromatic light or in analog modulation of the wavelength of incident non-monochromatic light. The device of FIG. 5B is configured for reflection-mode operation by adding an approximately 100% reflective surface (53). Reflective surface (53) can replace the transparent substrate walls of the CSLC cell (50). This reflection mode device requires only one quarter-wave plate (51) and the smectic LC cell (50) is designed to be a quarter-wave plate for the wavelength of monochromatic or coherent light to be modulated. The reflection only device operates as a pure phase modulator. As indicated in FIG. 5, the optic axes of quarter-wave plate(s) of the phase modulator are oriented at ±4.5° to the direction of polarization of incident light and are parallel or perpendicular to each other.

The following mathematical expressions describe the operation of the analog modulator of FIG. 5 which consists of two passive quarter-wave layers and an active half-wave layer. The Jones matrix describing this composite structure is given by $$Q(\theta) = A W(\theta) A, \tag{14}$$

where $A$ and $W(\theta)$ are the matrices corresponding to the quarter-wave plate and half-wave plate, respectively.

The matrix for the quarter-wave plate oriented at angle $-\pi/4$ (with respect to the direction of polarization of incident light) is given by $$A = \frac{e^{i\phi_A}}{\sqrt{2}} \begin{vmatrix} 1 & i \\ i & 1 \end{vmatrix}, \tag{15}$$

where $\phi_A$ is the common phase factor due to the quarter-wave plate and is given by $$\phi_A = \frac{\pi(n_o + n_e)l}{\lambda}, \tag{16}$$

where $n_o$ and $n_e$ are the ordinary and extraordinary indices of refraction of the retarder (i.e., the wave plate), $l$ is the thickness of the quarter-wave plate, and $\lambda$ is the freespace wavelength of the incident optical field.

The matrix corresponding to the active half-wave plate is given by $$W(\theta) = e^{i(2\phi_A + \phi_W)} \begin{vmatrix} -i\cos[2\theta] & -i\sin[2\theta] \\ -i\sin[2\theta] & i\cos[2\theta] \end{vmatrix}, \tag{17}$$

where $\theta$ is the orientation of the CSLC molecular director in the absence of an electric field and $\phi_W$ is the common phase factor for the half-wave plate.

Substitution of the above matrices into Equation 14 produces the following matrix $$Q(\theta) = e^{i(2\phi_A + \phi_W)} \begin{vmatrix} \sin[2\theta] - i\cos[2\theta] & 0 \\ 0 & \sin[2\theta] + i\cos[2\theta] \end{vmatrix}. \tag{18}$$

Letting $\Psi = (\theta - \pi/4)$, Equation 17 is reduced to the following matrix, which can be recognized as a single retarder oriented at angle 0° with retardation $4\Psi$ $$Q(\alpha) = e^{i(2\phi_A + \phi_W)} \begin{vmatrix} e^{i2\Psi} & 0 \\ 0 & e^{-i2\Psi} \end{vmatrix}. \tag{19}$$

The phase modulator of FIG. 5 is a specific example of a variable retarder implemented with a planar-aligned, analog CSLC cell. In this example, the input light is linearly polarized and oriented at 0° (i.e. at 45° to the optic axes of the quarter-wave plates). In the generalized case, a variable retarder comprises the same elements as the modulator of FIG. 5. However, the polarization of the input light can be elliptical as well as linear and can have any orientation. Equation 19 describes the composite structure of the general case.

FIG. 6 illustrates an optical modulator comprising the analog phase modulator of FIG. 5 within a resonance cavity operating in transmission/reflection mode. The numbering of elements in FIG. 6 is the same as in FIG. 5. The resonance cavity of the device of FIG. 6 is formed by reflective surfaces 61 and 62, which are parallel and opposed such that light entering the resonance cavity is reflected at least once, i.e., the light makes at least one pass through the cavity before exiting the device. The resonance cavity has length, L, and extends between the reflective surfaces, at least one of which is transmissive to allow light to enter the resonance cavity. The wave plates are positioned parallel to and between the reflective surfaces. The optic axes of the two quarter-wave plates 51 and 52 are oriented at an angle of ±45° with respect to the direction of polarization of linearly polarized incident light (i.e., at 45° to the plane of vibration of incident light). The cavity may optionally include one or more isotropic layers (e.g., 63) aligned parallel to the wave plates serving to alter the length of the resonance cavity if so desired.

The operation of the etalon of FIG. 6 in transmission/reflection mode is as follows: Linearly polarized, monochromatic or coherent light of the design wavelength is illuminated into the etalon along a propagation axis through the reflective surfaces and wave plates. In transmission mode, modulated light is analyzed or detected on the opposite side of the device from which it enters the etalon. A variable voltage or electric field is applied to the electrodes of the LC cell to rotate the optic axis of the cell in the plane of the substrate walls which form the aperture of the smectic LC cell. The optical axis of the material can be rotated from $-\Psi_{MAX}$ to $+\Psi_{MAX}$ (a total of $2\Psi_{MAX}$) by application of a maximal voltage $-V_{MAX}$ or $+V_{MAX}$, respectively, where $\Psi_{MAX}$ is the maximum voltage dependent tilt angle intrinsic to smectic LC material. Rotation of the optic axis of the smectic LC modulates the intensity of monochromatic, coherent light. An exit polarizer is not required to detect intensity modulation. Analogously, the wavelength of non-monochromatic linearly polarized light is modulated by the device of FIG. 6 and polarization analysis is not required to detect the wavelength modulation.

Referring to the equations above for the device of FIG. 5, the analog etalon modulator of FIG. 6 in transmission/reflection-mode can be analyzed by summing a series of partial waves, corresponding to successive round-trips in the cavity, which are transmitted by the device. The mathematical analysis assumes the device is operated in the transmission mode with two quarter-wave plates and a half-wave smectic LC cell, that there is no mirror absorption, that the etalon mirrors have the same reflectivity (R) and that the device includes an isotropic spacer. The matrices corresponding to the return pass are the transpose of the matrices of the forward passes and are denoted by the superscript T. It is assumed that incident light is illuminated along the axis normal to confining glass plate of the CSLC cell. The first three partial waves can be expressed as $$E_1 = tQ(\Psi)tPEe^{i\Phi I}, \qquad (20)$$

$$E_2 = tQ(\Psi)rQ^T(\Psi)rQ(\Psi)tPEe^{i3\Phi I}, \qquad (21)$$

$$E_3 = tQ(\Psi)rQ^T(\Psi)rQ(\Psi)rQ^T(\Psi)rQ(\Psi)tPEe^{i5\Phi I}. \qquad (22)$$

In the above column matrix (Equations 20-22), $\phi_I$ is the phase factor due to a single pass through the isotropic layer, and is given by $$\phi_I = \frac{2\pi n_I d_I}{\lambda}, \qquad (23)$$

where $n_I$ and $d_I$ are the index of refraction and thickness of the spacer layer, respectively; PE is the field of the incident light, which is polarized in the x direction as shown in FIG. 6 and is given by $$P = \begin{vmatrix} 1 & 0 \\ 0 & 0 \end{vmatrix}; \qquad (24)$$

t and r are the complex field transmission and reflection coefficients, respectively, of the reflective surface, which are in this analysis assumed to be identical. With these and the above assumptions the following simplifications can be made $$t^2 = (1-R), r^2 = R, \qquad (25)$$

where R is the reflectivity of the reflective surfaces. Additionally, because the matrix representing Equation 18 is its own transpose, the first three partial waves can be rewritten as $$E_1 = (1-R)Q(\Psi)PEe^{i\Phi I}, \qquad (26)$$

$$E_2 = (1-R)RQ^3(\Psi)PEe^{i3\Phi I}, \qquad (27)$$

$$E_3 = (1-R)R^2Q^5(\Psi)PEe^{i5\Phi I}. \qquad (28)$$

The field transmitted by the device, E' is an infinite sum of all partial waves transmitted through the device, and is given by $$E' = E_1 + E_2 + E_3 + \ldots \qquad (29)$$

Substituting Equations 26-28 into Equation 29, the transmitted field is given by $$E' = (1-R)[1 + RQ^2(\Psi)e^{i2\Phi I} + R^2Q^4(\Psi)e^{i4\Phi I} + \ldots] e^{i\Phi I}Q(\Psi)PE. \qquad (30)$$

This sum can be rewritten as $$E' = \sum_{n=0}^{\infty} [RQ^2(\Psi)e^{i2\phi I}]^n (1-R)e^{i\phi I}Q(\Psi)PE, \qquad (31)$$

where n is an integer. The sum then converges to the following $$E' = \frac{(1-R)Q(\Psi)e^{i\phi I}}{1 - RQ^2(\Psi)e^{i2\phi I}} PE. \qquad (32)$$

Assuming an x polarized incident optical field with amplitude $E_o$, the input field becomes $$PE = E_o \begin{vmatrix} 1 \\ 0 \end{vmatrix}. \qquad (33)$$

Substituting expressions of Equations 18 and 33 into equation 32, the transmitted field is rewritten as $$E' = \frac{(1-R)e^{i(\phi + 2\Psi)}}{1 - Re^{i2(\phi + 2\Psi)}} E_o, \qquad (34)$$

where $\phi$ is the sum of all absolute phases accumulated in the cavity in a single pass $$\Phi = (2\Phi_A + \Phi_W + \Phi_I). \qquad (35)$$

Thus, the intensity transmission function, for the device of FIG. 6, can be obtained from Equation 34, based on the relationship $T(\lambda) = |E'/E|^2$, $$T(\lambda) = \frac{(1-R)^2}{(1-R)^2 + 4R\sin^2(\phi + 2\Psi)}. \quad (36)$$

Using reasonably high reflectivity mirrors (e.g., R>85%), this function is characterized by a series of narrow spectral peaks (with a theoretical unity transmission) separated by broad bands with strong rejection. Transmission maxima occur when the sinusoidal term in the denominator of Equation 36 vanishes, or $$\phi + 2\Psi = m\pi, \quad (37)$$

where m is the order of the cavity resonance. Because each of the absolute phase factors is completely arbitrary, the total phase factor can be expressed in the following manner without sacrificing the generality of transmission function $$\phi = \frac{2\pi L}{\lambda}, \quad (38)$$

where L represents the distance of a single optical pass through the device (or actual cavity length thereof). Substituting the above expression into Equation 37, the wavelengths of peak transmission can be calculated.

In order to electronically tune or shift the spectral peak transmitted by the device of FIG. 5, the molecular director of the smectic LC half-wave plate is rotated so that the angle $\Psi$ is varied to a $\Psi_{MAX}$. When the optic axis of the FLC is aligned with the polarization of incident light, i.e., $\Psi=0°$, maxima of order m, and (m−1) occur for $$\frac{1}{\lambda_0} = m/2L \text{ and } \frac{1}{\lambda_{-1}} = \frac{(m-1)}{2L}, \quad (39)$$

respectively. The difference in these expressions gives the Free-Spectral-Range (FSR) ($\Delta\lambda = \lambda_{-1} - \lambda_0$), which is the wavelength separation between transmission maxima $$\Delta\lambda = \frac{\lambda_0^2/2L}{1 - \lambda_0/2L}. \quad (40)$$

By changing $\Psi$, the resonance of order m shifts from $$\lambda_0 = \frac{2L}{m} \text{ to } \lambda_\alpha = \frac{2L/m}{1 - (2\Psi/\pi m)}. \quad (41)$$

The difference of the two expressions in the above equations, $\delta\lambda = \lambda_{105} - \lambda_0$, represents the spectral shift due to the electro-optic tuning of the analog CSLC $$\delta\lambda = \frac{\alpha\lambda_0^2/\pi L}{1 - \alpha\lambda_0/\pi L}. \quad (42)$$

Allowing $\Delta\lambda = \delta\lambda$, the rotation of smectic LC molecular director required to tune the analog device of FIG. 6 through a FSR is $\Psi = \pi/2$. Currently, analog SmA* materials are commercially available which are capable of yielding tilt angles ($\Psi$) greater than $\pi/8$, hence, total director rotations exceeding $\pi/4$, thereby permitting analog tuning over a range greater than one-half of a FSR with a single SmA*/liquid crystal cell.

The device of FIG. 6 also functions as an analog intensity modulator of monochromatic or coherent light with, for example, a planar-aligned surface-stabilized SmA* LC. Assuming a monochromatic or coherent input, the device optical thickness can be selected such that the transmission, with a large negative bias ($-10$ V/$\mu$m) applied to the modulator, is unity. A slight change in voltage produces a small phase shift in the cavity adequate to shift the wavelength of the device resonance by a significant percentage of its spectral width. This, in turn, causes a sharp change in the intensity transmitted by the device. For a phase change of $\pi/2$, the transmission at the wavelength of incident light is midway between the $m^{th}$ and $(m+1)^{th}$ resonance corresponding to a minimum in transmission. This approach provides analog optical intensity modulation without resort to the large voltages which are required to produce a very small change in the index of refraction of the electro-optic materials in prior art Fabry-Perot electro-optic modulators.

Consider an analog device of FIG. 6 designed to modulate monochromatic or coherent light of wavelength $\lambda_0$. The SmA* liquid crystal contained in the resonance cavity is designed to be a half-wave plate at this wavelength, as are the two zero-order quarter-wave plates. The cavity thickness, representing the quarter-wave plates, SmA* half-wave plate and optional isotropic spacer, is selected to permit, upon biasing the liquid crystal cell with a large negative voltage, a tilt of $-\Psi_{MAX}$ relative to the input polarization and an $m^{th}$ resonance coinciding with the design wavelength $\lambda_0$. The transmission function in this case becomes $$T(\Psi) = \frac{(1-R)^2}{(1-R)^2 + 4R\sin^2(\pi m + 2[\Psi_{MAX} + \Psi])}. \quad (43)$$

Clearly, the order of the resonance m is not important in determining the output transmission function, which can be rewritten as $$T(\Psi) = \frac{(1-R)^2}{(1-R)^2 + 4R\sin^2(2[\Psi_{MAX} + \Psi])}. \quad (44)$$

The liquid crystal molecules can be reoriented, in an analog fashion, with an applied electric field. The range in angles, $-\Psi_{MAX} \to \Psi_{MAX}$, produces a corresponding analog phase change of $0 \to 2\Psi_{MAX}$. The transmission function, therefore, varies from $T_{MAX}=1$ to $$T_{MIN} = \frac{(1-R)^2}{(1-R)^2 + 4R\sin^2(4\Psi_{MAX})}. \quad (45)$$

The achievable contrast ratio, $T_{MAX}/T_{MIN}$, is given by $$C = 1 + \frac{4R}{(1-R)^2} \sin^2(4\Psi_{MAX}), \quad (46)$$

where the maximum contrast ratio occurs for $\Psi_{MAX} = \pi/8$.

The design of the resonance cavity depends upon the application requirements. A particular design, for example, might require a high contrast ratio, while another might require linearity in the transmission versus voltage characteristic. From the above expression, it can be seen that high contrast ratio is achieved at the expense of linearity. The contrast ratio, while varying with tilt angles, is much more sensitive to the reflectivity of the mirrors. This is because the change in transmission occurs rapidly near resonance, but flattens out quickly.

Consider a modulator containing intracavity a single SmA* FLC cell positioned between parallel polarizers, with an SmA* cell being designed to be a half-wave plate at the wavelength of incident radiation. The transmission function is given by $$T(\Psi) = \cos^2(2\Psi). \tag{47}$$

Figure 7:
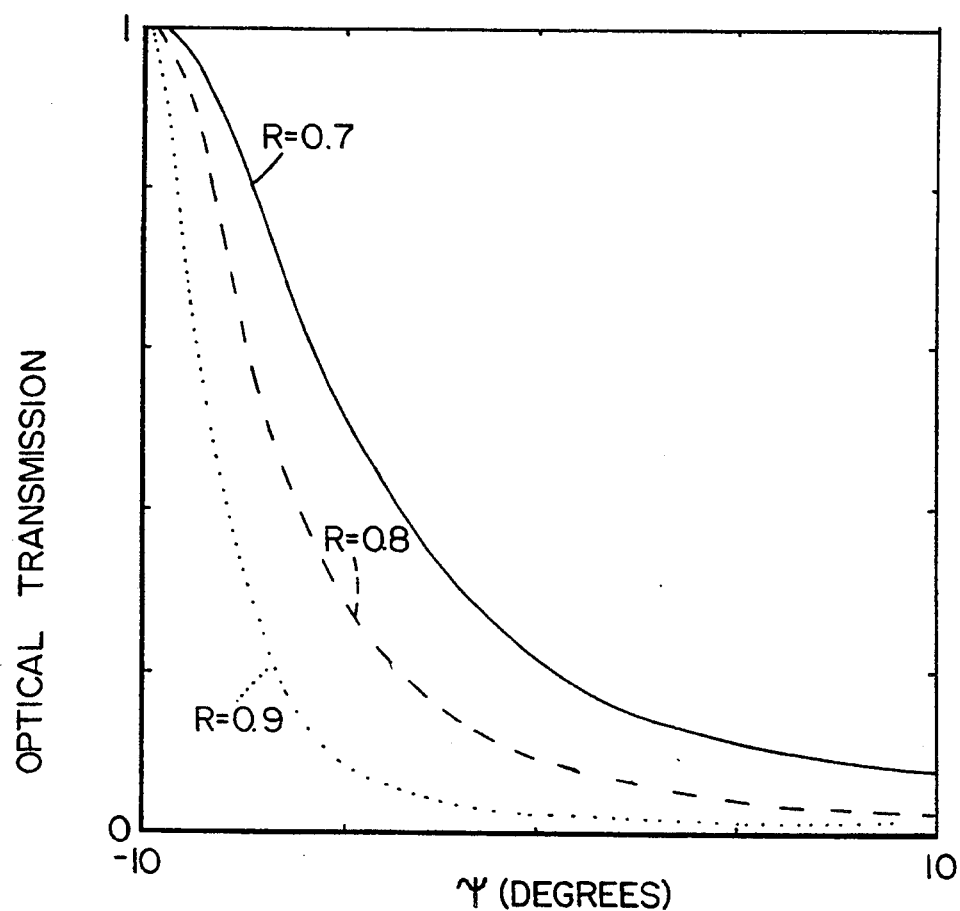
FIG. 7 is a graph showing the relationship between optical transmission of a typical device of FIG. 6 and molecular rotation corresponding to different values of mirror reflection.

For a 20° total range of rotation in the FLC molecular director, the transmission can be varied between unity and 60% corresponding to a contrast ratio of C=1.7. This contrast ratio is comparable to the output of a typical Fabry-Perot device containing a material with the same range of tilt. From Equation 44, a mirror reflectivity of R=0.7, 0.8 and 0.9 results in a contrast ratio of C=14, 34 and 150, respectively. FIG. 7 shows the relationship of transmission versus molecular rotation, $\Psi$, for three different mirror reflectivities, R=0.7, R=0.8 and R=0.9. FIG. 7 demonstrates that the slope near resonance increases as the contrast ratio increases, thereby reducing the resolution and requiring accuracy in tuning of device. In other words, for a device condition near resonance, a very small change in voltage applied to the cell can produce a large change in the transmission. FIG. 7 shows the slope corresponding to R=0.7, or the lowest contrast ratio, is most linear. On the other hand, the slope representing R=0.9 is highly non-linear, wherein a 5° change in $\Psi$ effects a substantial transmission change from unity to 8%, while a subsequent angular change of 15° produces only a minimal transmission change from 8% to 0.7%. Thus, a high contrast is exhibited with a highly nonlinear transmission function.

The modulator of FIG. 6 can be operated in the reflection-only mode to give pure phase modulation of incident linearly polarized, coherent, monochromatic light as is illustrated in the device configuration of FIG. 8. Operation in reflection only mode requires that one of the reflective surfaces, i.e., 62 be approximately 100% reflective. The resonance cavity thereof operates to fold the optical path numerous times thereby effecting a long effective interaction length. The increased interaction length in turn produces a large phase change with only a small rotation of the molecular director.

FIG. 8 shows an exemplary configuration of an analog tuning asymmetric Fabry-Perot phase modulator operating in reflection-only mode comprising a resonance cavity formed by a front reflective surface (81) having R1<1, a quarter-wave plate (83) for the design wavelength to be modulated, an analog chiral smectic LC cell (80), preferably planar-aligned, which is a quarter-wave plate for that design wavelength and a back reflective surface (82) having R2=1. The optic axis of the quarter-wave plate (83) is oriented at 45° with respect to the direction of polarization of incident light. It is preferred that the optic axis of the smectic LC quarter-wave plate (80) in zero field state is aligned with the direction of polarization of incident light. The electrodes of the smectic LC quarter-wave plate (not illustrated in FIG. 8) are connected to a variable voltage source in order to tune the phase modulator. The coherent, monochromatic linearly polarized light beam of design wavelength is illuminated, along the axis normal to the mirrors, through the device.

The following mathematical description of the reflection-only mode phase modulator is analogous to that provided above for the transmission mode device and is based on the assumptions that the amplitude of the light is unaffected by the reflective surfaces, the back reflective surface is an ideal, no-loss, reflector and incident radiation is propagated along the axis normal to the confining substrate plates of the device.

The Jones matrix for the round-trip of light through the device of FIG. 8, due only to the two wave plates, analogous to equation 14, is given by $$Q(\theta) = [AW(\theta)]^T W(\theta) A, \tag{48}$$

where A and $W(\theta)$ are the matrices for the forward pass through the quarter-wave plate and the half-wave plate, respectively, while the matrices for the return pass through said plates are given as the transpose, denoted by the superscript T, of those representing the forward pass.

The matrix, A, corresponding to the quarter-wave plate, the optic axis of which is oriented at $-\pi/4$ with respect to that of the FLC cell, and is given by equation 14, above, where $\phi_A$ again is the common phase factor due to the quarter-wave plate and is given by equation 15.

The matrix, $W(\theta)$, corresponding to the active quarter-wave plate is given by $$W(\theta) = \frac{e^{i\phi_w}}{\sqrt{2}} \begin{vmatrix} 1 - i\cos[2\theta] & -i\sin[2\theta] \\ -\sin[2\theta] & 1 + i\cos[2\theta] \end{vmatrix}, \tag{49}$$

where, as above, $\theta$ is the orientation of the FLC molecular director in the absence of an electric field (zero filed state), and, as before, $\phi_w$ is the common phase factor for the active quarter-wave plate. Since the light interacts with an optical resonator, the absolute phase terms are important in this analysis. Since the matrices of equations 14 and 49 are their own transposes, Equation 48 can be rewritten as $$Q(\theta) = A[W(\theta)]^2 A. \tag{50}$$

Substituting the matrices in Equations 15 and 49 into Equation 50, the Jones matrix for the device becomes $$Q(\theta) = e^{i2(\phi_A + \phi_w)} \begin{vmatrix} \sin[2\theta] - i\cos[2\theta] & 0 \\ 0 & \sin[2\theta] + i\cos[2\theta] \end{vmatrix} \tag{51}$$

Letting $\Psi = (\theta - \pi/4)$, Equation 51 is simplified to the matrix of equation 19, a single retarder oriented at angle 0°, with retardation $4\Psi$.

The reflection-only mode phase modulator can be analyzed, as was done above in Equations 20-22, by summing a series of partial waves, corresponding to successive round-trips in the cavity. The first four partial waves can be written as $$E_1 = rE, \tag{52}$$

$$E_2 = t^2 Q(\Psi) E, \tag{53}$$

$$E_3 = t^2 Q(\Psi) r Q(\Psi) E, \tag{54}$$

$$E_4 = t^2 Q(\Psi) r Q(\Psi) r Q(\Psi) E. \tag{55}$$

In the column matrix (equations 52-55), E is the input optical field, which is either polarized in the x [horizontal] or y [vertical] direction, or is, in the alternative, polarized arbitrarily and passes first through an x or y oriented polarizer; t and r are the complex field transmission and reflection coefficients of the front mirror.

The total field reflected by the device is given as an infinite sum of the partial waves ($E_r = E_1 + E_2 + E_3 + \ldots$). The sum of the first four waves gives an indication of the form of the infinite series, which can be rewritten as, $$E_r = -rE + Q(\Psi)t^2E + [Q(\Psi)]^2 t^2 rE + [Q(\Psi)]^3 t^2 r^2 E + \ldots \quad (56)$$

A $\pi$ phase shift is included in the first term relative to subsequent terms. This is done to simplify the analysis, without loss of generality, because the phase factor contained in $Q(\Psi)$ is arbitrary. In addition to the absolute phase due to the two wave plates, an isotropic spacer layer could also be include in the device to modify the characteristics of the cavity. One of ordinary skill in the art, in view of the disclosure herein, can modify the mathematical expressions herein to incorporate the isotropic layer.

Assuming input light is polarized along the x direction, as indicated in FIG. 8, the series in Equation 56 can be written as $$E_r = \left| -r + t^2 e^{i\phi} e^{i2\Psi} \sum_{n=0}^{\infty} [r e^{i\phi} e^{i2\Psi}]^m \right| E_o, \quad (57)$$

where n is an integer and $\phi$ is given by $$\Phi = 2(\Phi_w + \Phi_A). \quad (58)$$

This sum converges to $$E_r = \left( -r + \frac{t^2 e^{i(\phi + 2\Psi)}}{1 - r e^{i(\phi + 2\Psi)}} \right) E_o. \quad (59)$$

Assuming no mirror absorption, the reflected intensity is equal to the incident intensity, and the relationship between the complex reflection and transmission coefficients can be determined. From Equation 59, the reflected intensity is given by $|E_r/E_o|^2$. Thus, the condition for conservation of energy is given as $$r^2 + t^2 = 1. \quad (60)$$

The complex reflection coefficient for the analog phase modulator, $r_d$, given by ($E_r/E_o$), can be written as $$r_d = \frac{-\sqrt{R} + e^{i(\phi + 2\Psi)}}{1 - \sqrt{R} \, e^{i(\phi + 2\Psi)}}. \quad (61)$$

where R is the reflectivity of the front mirror. Since the device is assumed to have no energy losses, the reflection coefficient for the phase modulator can be written as $$r_d = e^{iX}, \quad (62)$$

where X is the induced phase shift and Equation 61 gives the real and imaginary parts of the phase function. These terms are given by $$\cos X = \frac{-2\sqrt{R} + (1 + R)\cos(\phi + 2\Psi)}{(1 + R) - 2\sqrt{R} \cos(\phi + 2\Psi)}, \quad (63)$$

and $$\sin X = \frac{(1 - R)\sin(\phi + 2\Psi)}{(1 + R) - 2\sqrt{R} \cos(\phi + 2\Psi)}. \quad (64)$$

Equation 63 and the identity: $\cos^2[X/2] = (1 + \cos X)/2$ produce $$\cos[X/2] = \frac{(1 - \sqrt{R})\cos(\phi/2 + \Psi)}{[(1 + R) - 2\sqrt{R} \cos(\phi + 2\Psi)]^{\frac{1}{2}}}. \quad (65)$$

Equations 63 and 64 and the identity: $\sin X = 2 \sin[X/2]\cos[X/2]$ produce $$\sin[X/2] = \frac{(1 + \sqrt{R})\sin(\phi/2 + \Psi)}{[(1 + R) - 2\sqrt{R} \cos(\phi + 2\Psi)]^{\frac{1}{2}}}. \quad (66)$$

The above two equations give the phase shift resulting from rotation of the molecular director of a smectic LC cell representing the active quarter-wave plate as $$X = 2\tan^{-1}\left[\frac{(1 + \sqrt{R})}{(1 - \sqrt{R})} \tan(\phi/2 + \Psi)\right]. \quad (67)$$

The preceding equation can be simplified by assuming that the phase is zero for $\Psi = 0°$, or $\phi/2 = m\pi$, where m is an integer representing the order of the device. The simplified phase expression is $$X = 2\tan^{-1}\left[\frac{(1 + \sqrt{R})}{(1 - \sqrt{R})} \tan\Psi\right]. \quad (68)$$

The induced phase shift (X) is a direct consequence of the rotation of the smectic LC molecular director. This phase shift is enhanced by the gain term due to the reflectivity of the front mirror.

Figure 9:
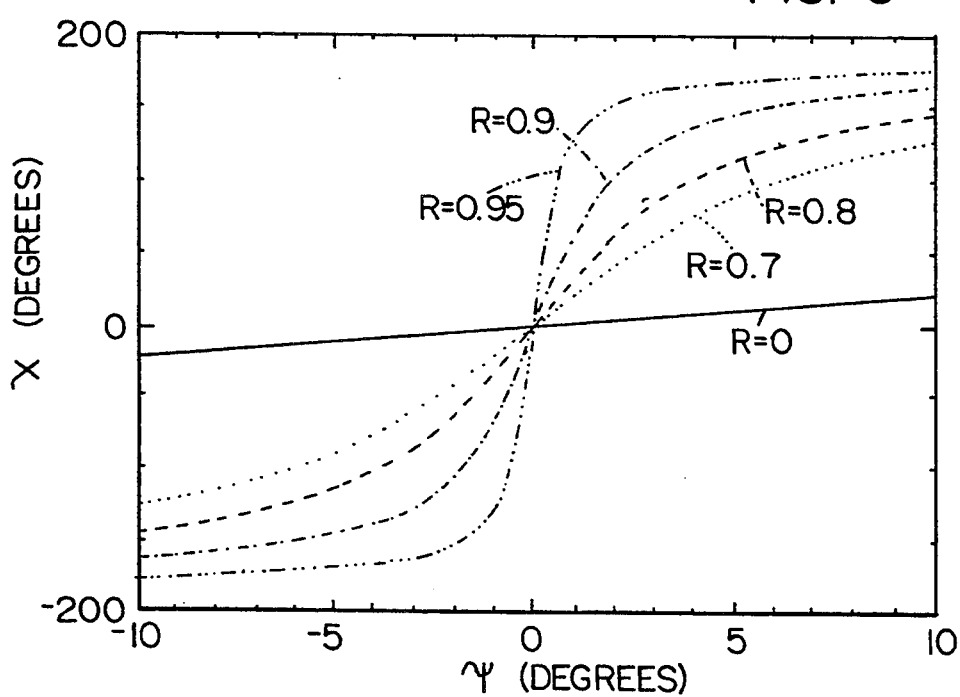
FIG. 9 is a graph of the relationship between resultant phase shift through a device of FIG. 8 corresponding to different values of reflectivity of the front mirror.

FIG. 9 shows a series of resultant phase shift $X(\Psi)$ for different R1 values of the front mirror. A SmA* material which has a maximum tilt of 10° is assumed in this analysis. Clearly, for R1=0, the gain factor is unity, and the phase change is limited to a maximum of $\pm 2\Psi$. This condition represents the linear solid line shown in FIG. 9. For R1=0.7, a dramatic change in modulation depth is observed over the previous case as shown by the dotted line of FIG. 9. Under this condition, the phase shift through the device can be tuned continuously from −126° to 126°. As R1 increases, the maximum achievable X saturates toward $\pm \pi$ and the phase function becomes more nonlinear. For R1=0.8, the phase shift can be tuned from −145° to 145°. For R1=0.9, the phase shift can be tuned from −163° to 163°. Finally, for R1=0.97, the phase shift can be tuned from −175° to 175°. Since the maximum phase change ever required is 2π, the analog phase modulator of FIG. 8, permits a broad analog tuning range over 97% of the maximum range.

IV. Exemplary Applications of the Optical Modulators of the Present Invention

The optical modulators of the present invention can be electronically or optically addressed. Exemplary embodiments of optically addressed modulators include configurations having photosensors, for example, using crystalline silicon or GaAs, or a thin film of an amorphous silicon, CdS, CdSe, GaAs, or functional equivalent photodiodes or photoconductors.

A single-pass transmission modulator is illustrated in FIG. 10. Surface-stabilized CSLC material is employed in half-wave retarder 100, which is flanked by quarter-wave plates 106 and 107 to make a variable retarder. The device further includes substrate walls (101 and 102), transparent electrodes (103 and 104), and a photosensor (105).

A specific embodiment of an optically addressed etalon modulator of the present invention is a modification of spatial light modulators as described, for example, by G. Moddel et al. (1989) Appl. Phys. Lett. 55(6):537 and I. Abdulhalim et al. (1989) Appl. Phys. Lett. 55 (16):1603. One specific reflection-only-mode phase modulator configuration is provided in FIG. 11. The exemplary device of FIG. 11 consists of transparent or semi-transparent substrate walls (117 and 118), e.g., made from glass, and contains a photosensor layer (110) which can be a photodiode, for example, a hydrogenated amorphous silicon photodiode or a photoconductor. One of the substrate walls is provided with a transparent electrode (115), e.g., a metal oxide film. The optical or asymmetric FP cavity is formed by reflective surfaces (113 and 114). The other substrate wall is provided with a transparent electrode 116 or the reflective surface 114 may serve as the second electrode. For a reflection-only mode modulator, the reflectivity of 113 is ideally 1, and the reflectivity of 114 is <1. The reflectivity of 113 should be sufficiently higher than that of 114 so that a significant portion of the incident light exits the cavity through 114 and 118. The device is provided with a planar-aligned layer of a chiral smectic liquid crystal material (111), for example, a surface-stabilized, planar-aligned SmA* or SmC* material, the optic axis of which is rotatable by application of an electric field across the layer. The device of FIG. 11 may also include alignment layers adjacent to the chiral smectic liquid crystal layer to assist alignment of the material. A square-wave clock voltage with an optional dc offset is applied between the electrodes 116 and 115 and an electric field is generated across the CSLC layer when an optical signal, i.e., the write beam (119), interacts with the photosensor layer (110).

A binary or ternary phase modulator results when a discrete planar-aligned, surface-stabilized chiral smectic liquid crystal layer is employed in layer 111. The orientation of the optic axis of the layer is switched by the optically activated, electric field placed across the CSLC during the negative cycle of the square-wave clock voltage. The device optic axis is switched back during the positive cycle of the square-wave clock voltage. Switching the orientation of the optic axis of the CSLC layer modulates linearly polarized light entering (the read beam) the modulator through substrate 118. Modulated light exits the device through substrate 118. An exit polarizer or polarization analyzer is not required to detect light modulation.

An analog phase modulator results when an analog planar-aligned, surface-stabilized chiral smectic liquid crystal material is employed in layer 111 and when a quarter-wave plate (112) is included in the modulator. In reflection-only-mode, the CSLC layer is preferably a quarter-wave plate for the wavelengths of light to be modulated.

Optical addressed intensity and wavelength modulators operated in transmission/reflection mode can be implemented by configurations similar to that of FIG. 11, using the descriptions of the present invention and well-known techniques of optical addressing.

In some embodiments, the reflective function of the reflective surface (113) can be performed by the interface between the photosensor layer (110) and the liquid crystal layer (111). If the difference in refractive indices between the materials employed for 110 and 111 is large enough, that interface will function to reflect light and, thus, function to form the etalon cavity.

An analog, planar-aligned optically addressed intensity and wavelength modulator operated in transmission/reflection-mode, a modification of the device of FIG. 11, requires two quarter-wave plates in the resonance cavity on either side of the analog CSLC half-wave layer. In a wavelength modulator, the quarter-wave plates are preferrably achromatic.

The optical modulators of the present invention can be fabricated as multiple pixel devices. Several exemplary embodiments of multi-pixel modulators are provided (in FIGS. 12-14).

VLSI (Very Large Scale Integration) integrated circuit backplane represents a means for electrically addressing a multi-pixel chiral smectic liquid crystal FP or folded optical path device. Such multiple pixel devices can be operated in transmission/reflection- or reflection-only mode. The desired chiral smectic liquid crystal material is positioned and appropriately aligned between a substrate overlayer and a VLSI backplane which comprises pixelated reflective surfaces. The substrate overlayer is provided with a reflective surface, such that multiple pixel resonance cavities are created between the opposing reflective surfaces of the substrate overlayer and the VLSI backplane. One or two birefringent elements, in particular quarter-wave plates can optionally be included in such a multi-pixel device between the CSLC material and either of the reflective surfaces. The individual resonance cavities of a multi-pixel device produced in this manner function as the individual CSLC modulators of this invention as described herein-above. The type of modulation is dependent on the mode of operation of the cavity, the type of alignment employed, the type of CSLC material employed and the tilt angle and birefringence of that material.

Figure 12:
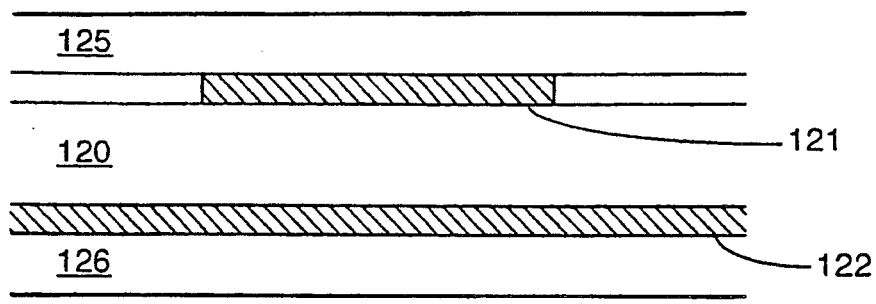
FIG. 12 is a cross-sectional view of an exemplary pixel of a VLSI binary phase, intensity or wavelength modulator having a planar-aligned SmC* LC cell.

A multi-pixel, binary phase, intensity or wavelength modulator results from the inclusion of a planar-aligned layer of a SmC* material having a 45° tilt angle between a VSLI backplane (125) comprising pixelated reflective surfaces (121) and a substrate overlayer (126) having a reflective surface that is less than 100% reflective (122) as in FIG. 12. When the pixelated reflective surfaces (121) are also less than 100% reflective and the VLSI device is operated in the transmission/reflection mode, binary intensity or wavelength modulation results.

When the back reflective surfaces (121), i.e., those of the VSLI backplane, are of significantly higher reflectivity than the front reflective surface (122), the device operates in reflection-only-mode, and a binary phase modulator results. The intracavity CSLC layer (120) is a SmC* 45° tilt angle material (planar-aligned and surface-stabilized). In the device of FIG. 12, the reflective surfaces, e.g., deposited metal mirrors, also serve as electrodes. Polarized coherent light incident on the modulator is phase modulated by passage through the SmC* layer. Polarized monochromatic incident light and polarized non-monochromatic incident light are intensity and wavelength modulated, respectively, by the device of FIG. 12.

Figure 13:
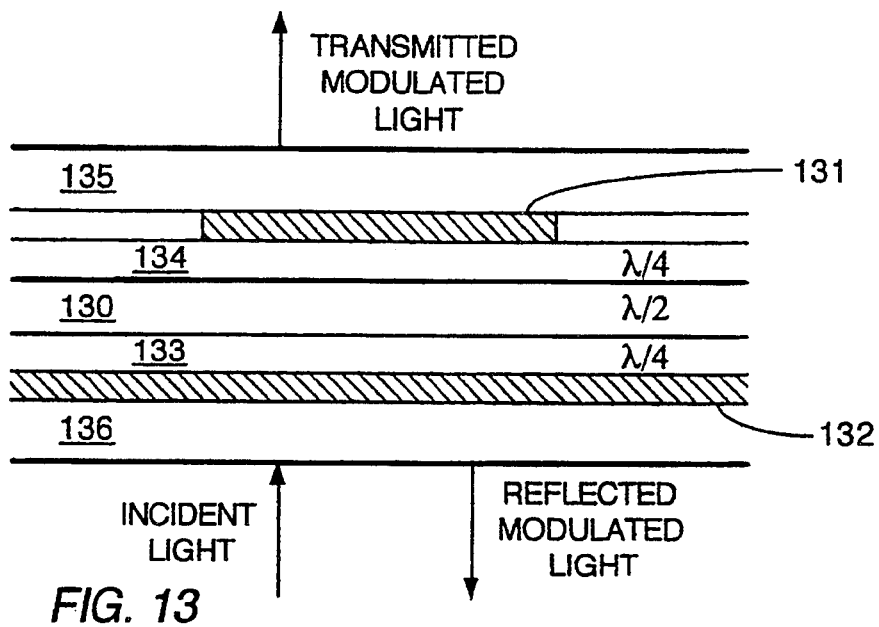
FIG. 13 is a cross-sectional view of an exemplary pixel of a VSLI analog intensity or wavelength modulator having a planar-aligned CSLC cell.

Another exemplary pixel of a VSLI configures reflection/transmission mode modulator is given schematically in FIG. 13. This modulator can function either to modulate the intensity of monochromatic or coherent light, or to modulate wavelength of non-monochromatic light. A pixelated VSLI backplane (135) provides a substrate with one reflective surface (131). A substrate overlayer (136) is provided with a second reflective surface (132). Within the resonance cavity formed by the reflective surfaces, there are two birefringent elements, specifically two quarter-wave plates (133 and 134). A layer of a planar-aligned, surface-stabilized SmA* liquid is provided (130). The reflective surfaces 131 and 132 also serve as electrodes in this configuration. The thickness of the layer is chosen such that the SmA* liquid crystal cell (130 between 131 and 132) is a half-wave plate for the light to be modulated. The quarter-waveplates used in the wavelength modulator are preferrably achromatic.

Figure 14:
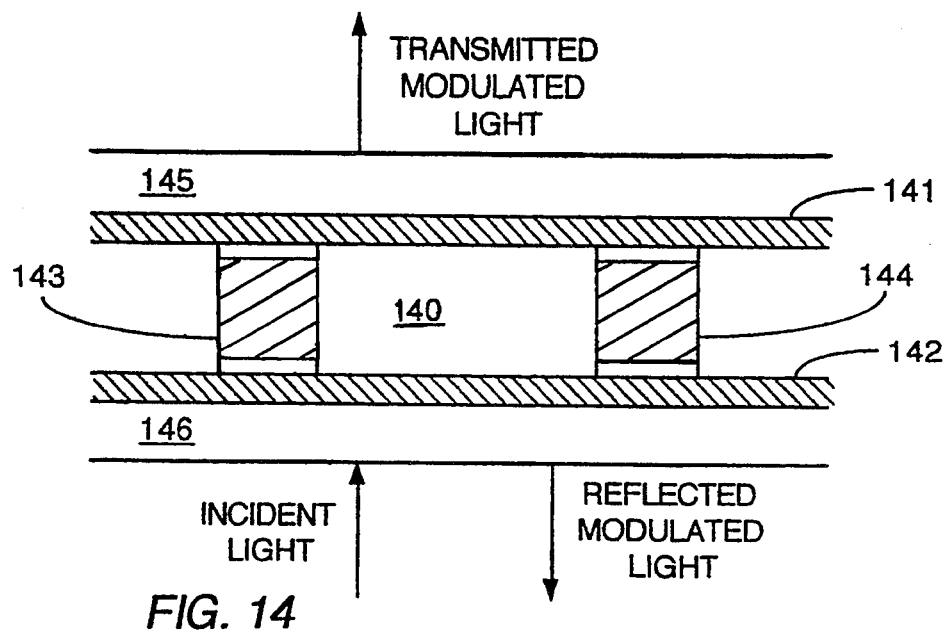
FIG. 14 is a cross-sectional view of an exemplary application of a homeotropically-aligned modulator of FIG. 4 of the present invention as a pixel in a multi-pixel array.

Yet another exemplary pixelated modulator is provided in FIG. 14. In this example, a homeotropically-aligned CSLC layer (140) is employed within a resonance cavity formed by a back reflective surface (141) and a front reflective surface (142) on substrate walls (145 and 146). Lateral electrodes are provided (143 and 144). These electrodes can be patterned, for example, to create a multi-pixel array. The Figure illustrates a transmission/reflection-mode device in which the reflectivities of 141 and 142 are both less than 1. Intensity and wavelength modulation of incident light can be performed by this device configuration. Any CSLC material can be employed in the homeotropically-aligned cell of FIG. 14. Discrete state CSLC materials give discrete modulation. Analog CSLC materials give analog modulation.

Examples of optically addressable, multi-pixel, binary and analog modulators are analogous to the VLSI configurations described above, except that the VLSI integrated circuit is replaced with means for optically addressing the multi-pixel array, including a photosensor. One type of multi-pixel FLC spatial light modulator is described in G. Moddel et al. U.S. Pat. No. 4,941,735 which is incorporated by reference herein. Optical addressing of CSLC cells has been described in Takahashi et al. (1987) Appl. Phys. Letts 51:19; Moddel et al. (1987) "The Proceedings of SPIE—The International Society for Optical Engineering 759:207-213 and Ashley et al. (1987) Applied Optics 26:241-246. Teachings of these references regarding optical addressing can be readily applied by those of ordinary skill in the art to the devices of the present invention.

The multi-pixel modulation herein can be electronically addressed or optically addressed as in known in the art. The individual pixels of these multi-pixel devices can be individually addressable, simultaneously addressable or certain combinations of pixels may be simultaneously addressable in desired patterns. Multipixel chiral smectic liquid crystal FP optical cavities modulators can be employed for a variety of display applications, including diffractive optical elements and holographic displays and can in addition be employed by appropriate choice of addressing schemes to create patterned modulators, for example to create a pattern of lines to generate a diffraction grating for beamsteering applications. The operation of such beamsteering diffractive grating is understood in the art.

Another exemplary application of a transmission/reflection mode CSLC etalon modulator of the present invention is the so-called "tunable tap" of FIG. 15. This device provides a means for "tapping" or selecting a desired wavelength of incident non-monochromatic light while minimizing overall loss of total light intensity. The device of FIG. 15 comprises two polarizing beam splitters (153 and 154), two total internal reflectance mirrors (159 and 160), a Faraday retarder (155) and two reflective surfaces (157 and 158) forming a resonance cavity on either side of a planar-aligned CSLC analog wavelength modulator (150-152) with elements positioned relative to each other as indicated in FIG. 15. The figure also indicates an input (A) and two outputs (B and C) for light. The planar-aligned CSLC analog wavelength modulator is exemplified as a planar-aligned CSLC half-wave plate (150) with two quarter-wave plates (151 and 152). The CSLC material employed is any planar-aligned analog material displaying a voltage-dependent rotation of its optic axis. Preferrably, the CSLC material is a planar-aligned, surface-stabilized SmA* material. The quarter-wave plates of the analog modulator are oriented at 0° or 90° with respect to light entering the resonance cavity.

Unpolarized light enters the device at input A and PBS1 (153) splits the incident light of the beams into two orthogonally polarized beams. A Faraday retarder (155) rotates the polarization of both beams by 45°. The operation of Faraday retarders is well known and understood in the art. Light enters the resonance cavity containing the modulator. The output PBS2 (154) is oriented at 45° to the input PBS1 (153). The rotated light exiting the resonance cavity is then split by PBS2 so that a selected wavelength is transmitted to output C while the remaining light is reflected from 158 back through the resonance cavity. (The resonance cavity is formed between the reflective surfaces (157) and (158) with reflectivities $R_1$ and $R_2 < 1$). An electric field is applied to the modulator (across the CSLC layer of the modulator) via cell electrodes (not shown) to select a wavelength for transmission to output port C. The wavelength that satisfies the condition $$\frac{2\pi \Delta nL}{\lambda} = m\pi,$$

where $\lambda$ is the selected $\lambda$, $\Delta n$ is the birefringence of the cavity, L is the cavity length and m is an integer, is transmitted to the output C. All other wavelengths of incident light are reflected back through the cavity and are transmitted through output port B.

While certain illustrative device configurations and application of the light modulators of the present invention have been described in detail in the specification, it should be understood that there is no intention to limit the invention to the specific forms and embodiments disclosed. On the contrary, the invention is intended to cover all modifications, alternatives, equivalents and uses fully within the spirit and scope of the invention as expressed in the appended claims.

TABLE 1

EXEMPLARY OPTICAL CAVITY CSLC MODULATORS

| Type of CSLC Material | Mode of[1] Operation | Type of Modulation[2] | | |
|---|---|---|---|---|
| | | Phase | Intensity | Wavelength |
| Planar Alignment | | | | |
| SmC* tilt = 45° | T/R | | +(B) | +[3] |
| | R | +(B)[4] | | |
| SmC* tilt = 45° | T/R | | +(B) | +(B) |
| | R | +(B) | | |
| SmA* | T/R | | +(A) | +[5] |
| | R | +(B)[4] | | |
| DHF | T/R | | +[6] | +[6] |
| | R | +(A)[4] | | |
| Antiferro-electric | T/R | | +(T) | +[7] |
| | R | +(B)[4] | | |
| SmA* + quarter-wave(s) | T/R | | +(A) | +(A) |
| | R | +(A) | | |
| SmC* + quarter-wave(s) | T/R | | +(B) | +(B) |
| | R | +(B) | | |
| DHF* + quarter-wave(s) | T/R | | +(A) | +(A) |
| | R | +(A) | | |
| SmA*/SmA*[8] Opposite[9] | T/R | | +(A) | +[8] |
| | R | +(B)[8] | | |
| DHF/SmA*[10] Same[11] | T/R | | +(A) | +(A) |
| | R | +(A) | | |
| DHF/SmA*[12] Opposite | T/R | | +(A) | +[12] |
| | R | +(B)[12] | | |
| DHF/DHF[13] Opposite | T/R | | +(A) | +[13] |
| | R | +(B)[13] | | |
| DHF/DHF[14] Same | T/R | | +(A) | +(A) |
| | R | +(A) | | |
| Homeotropic Alignment | | | | |
| SmC* tilt ≠ 45° or = 45° | T/R | | +(B) | +(B) |
| | R | +(B) | | |
| SmA*/homeo | T/R | | +(A) | +(A) |
| | R | +(A) | | |
| DHF | T/R | | +(A) | +(A) |
| | R | +(A) | | |
| Antiferro-electric | T/R | | +(T) | +(T) |
| | R | +(T) | | |

Footnotes to Table 1.

[1]"T/R" represents transmission/reflection-mode and "R" represents reflection-only-mode.

[2]Many of the modulators of Table 1 effect a phase change in transmission/reflection-mode which is detectible as intensity or wavelength modulation. A "+" indicates detectible modulation, "B" represents binary, "A" represents analog and "T" represents ternary. Incident coherent light is phase modulated, incident monochromatic and/or coherent light is intensity modulated and incident non-monochromatic light is wavelength modulated.

[3]This modulator selects between an output transmitting one wavelength and an output transmitting two wavelengths.

[4]This modulator selects between two phases of input light, but output of a selected phase will not necessarily have same direction of polarization.

[5]For non-monochromatic incident light, this device provides analog intensity modulation of two selected wavelengths.

[6]In planar-aligned DHF devices there is a change in birefringence of the CSLC layer and a rotation of polarization of incident light on application of an electric field to the device.

[7]This modulator selects between one output transmitting one wavelength and two other outputs transmitting two wavelengths at different intensities. Similar to SmC* planar-aligned tilt ≠ 45°.

[8]Optic axes of SmA* cells within a series in resonance cavity are rotated in opposite directions to leverage rotation of polarization of incident light. Intensity modulation is analog. Wavelength modulation is similar to (footnote 5, above) except that when both SmA* cells have $\Psi_{MAX} = 22.5°$, wavelength modulation is binary. Phase modulation is similar to that in footnote 4, above, except that when $\Psi_{MAX}$ of both cells is 22.5° phase modulated light exits with the same direction of polarization.

[9]"Opposite" indicates that the optic axes of cells rotate in opposite directions.

[10]DHF and SmA* cells in series with optic axes rotating in the same direction and to the same extent. This cell combination effects a change in birefringence.

[11]"Same" indicates that the optic axes of cells rotate in same direction.

[12]DHF and SmA* cells in series with optic axes rotating in opposite directions to the same extent exhibit no change in birefringence. This cell combination behaves like two planar-aligned SmA* cells in series.

[13]Two DHF cells in series whose optic axes rotate in opposite directions and to the same extent. The device exhibits no birefringence change. Similar to combinations described in footnotes 8 and 12.

[14]Two DHF cells in series whose optic axes rotate in the same direction and to the same extent. The device exhibits no rotation of polarization of incident light but exhibits an increase in the change in birefringence. The modulator functions to that of footnote 10.

We claim:

1. A variable retarder for elliptically polarized light comprising:

a first half-wave plate comprising a first planar-aligned chiral smectic liquid crystal cell, said cell having a rotatable optic axis;

means for applying an electric field across said liquid crystal cell to rotate said optic axis; and first and second quarter-wave plates positioned in series with and on either side of said half-wave plate, the optic axes of said quarter-wave plates oriented parallel or perpendicular to each other;

wherein the combination of said half-wave plate with said quarter-wave plates produces a retardance which is varied by rotation of said rotatable optic axis; and wherein the polarization of said incoming light may be oriented at any angle with respect to the optic axis of said first quarter-wave plate, except for linearly polarized light oriented at ±45°.

2. The variable retarder of claim 1 wherein said planar-aligned chiral smectic liquid crystal cell is selected from the group consisting of: a surface-stabilized SmA* cell, a surface-stabilized SmC* cell and a distorted helix ferroelectric cell.

3. The variable retarder of claim 1 wherein said quarter-wave plates are achromatic quarter wave plates.

4. The variable retarder of claim 1 wherein said planar-aligned chiral smectic liquid crystal cell is a surface-stabilized SmA* cell.

5. The variable retarder of claim 1 for use with an optical addressing signal and further comprising a photosensor means, optically coupled with said addressing signal and electrically connected with said electric field applying means, for varying the applied electric field in response to said addressing signal.

6. The variable retarder of claim 1 further including a second half-wave plate comprising a second planar-aligned chiral smectic liquid crystal cell disposed between said first and said second quarter-wave plates, said second liquid crystal cell having a rotatable optic axis.

7. The variable retarder of claim 6 wherein the first and the second planar-aligned chiral smectic liquid crystal cells are SmA* cells.

8. The variable retarder of claim 7 wherein said optic axes of said first and said second liquid crystal cells are rotatable in opposite directions.

9. The variable retarder of claim 6 wherein said second liquid crystal cell is a distorted helix ferroelectric cell.

10. The variable retarder of claim 9 wherein the first liquid crystal cell is selected from the group consisting of: a surface-stabilized SmA* cell, a surface-stabilized SmC* cell and a distorted helix ferroelectric cell.

11. A variable retarder of linearly polarized light comprising:

a first half-wave plate comprising a first planar-aligned chiral smectic liquid crystal cell, said cell having a rotatable optic axis;

means for applying an electric field across said liquid crystal cell to rotate said optic axis; and first and second quarter-wave plates positioned in series with and on either side of said half-wave plate, the optic axes of said quarter-wave plates oriented parallel or perpendicular to each other;

wherein the combination of said half-wave plate with said quarter-wave plates produces a retardance which is varied by rotation of said rotatable optic axis; and wherein the polarization of said linearly polarized light is oriented at ±45° with respect to the optic axis of said first quarter-wave plate.

12. The variable retarder of claim 11 wherein said planar-aligned chiral smectic liquid crystal cell is selected from the group consisting of: a surface-stabilized SmA* cell, a surface-stabilized SmC* cell and a distorted helix ferroelectric cell.

13. The variable retarder of claim 11 wherein said quarter-wave plates are achromatic quarter wave plates.

14. The variable retarder of claim 11 wherein said planar-aligned chiral smectic liquid crystal cell is a surface-stabilized SmA* cell.

15. The variable retarder of claim 11 for use with an optical addressing signal and further comprising a photosensor means, optically coupled with said addressing signal and electrically connected with said electric field applying means, for varying the applied electric field in response to said addressing signal.

16. The variable retarder of claim 11 further including a second half-wave plate comprising a second planar-aligned chiral smectic liquid crystal cell disposed between said first and said second quarter-wave plates, said second liquid crystal cell having a rotatable optic axis.

17. The variable retarder of claim 16 wherein the first and the second planar-aligned chiral smectic liquid crystal cells are SmA* cells.

18. The variable retarder of claim 17 wherein said optic axes of said first and said second liquid crystal cells are rotatable in opposite directions.

19. The variable retarder of claim 16 wherein said second liquid crystal cell is a distorted helix ferroelectric cell.

20. The variable retarder of claim 19 wherein the first liquid crystal cell is selected from the group consisting of: a surface-stabilized SmA* cell, a surface-stabilized SmC* cell and a distorted helix ferroelectric cell.

21. A reflection-mode variable retarder of elliptically polarized light comprising:

a quarter-wave plate comprising a planar-aligned chiral smectic liquid crystal cell, said cell having a rotatable optic axis;

means for applying an electric field across said liquid crystal cell to rotate said optic axis;

a passive quarter-wave plate positioned on a first side of said liquid crystal cell; and reflective means, positioned on the second side of said liquid crystal cell, for reflecting light back through said liquid crystal cell and back through said passive quarter-wave plate;

wherein the combination of said half-wave plate with said quarter-wave plate and said reflective means produces a retardance which is varied by rotation of said rotatable optic axis.

22. The reflection-mode variable retarder of claim 21 wherein said elliptically polarized light is linearly polarized light, the polarization of said linearly polarized light oriented at ±45° with respect to the optic axis of said passive quarter-wave plate.

23. The reflection-mode variable retarder of claim 21 wherein the reflectivity of said reflective means is approximately 100%.

24. The reflection-mode variable retarder of claim 21 wherein said planar-aligned chiral smectic liquid crystal cell is a SmA* cell.

25. An etalon modulator of elliptically polarized light comprising:

front reflective means and back reflective means for providing an optical resonance cavity, and for coupling the elliptically polarized light into said resonance cavity through said front reflective means; and a variable retarder positioned within said cavity, said variable retarder comprising:

a half-wave plate comprising a planar-aligned chiral smectic liquid crystal cell, said cell having a rotatable optic axis;

means for applying an electric field across said liquid crystal cell to rotate said optic axis; and first and second quarter-wave plates positioned in series with and on either side of said half-wave plate, the optic axes of said quarter-wave plates oriented parallel or perpendicular to each other;

wherein the combination of said half-wave plate with said quarter-wave plates produces a retardance which is varied by rotation of said rotatable optic axis.

26. The etalon modulator of claim 25 wherein said elliptically polarized light is linearly polarized light, the polarization of said linearly polarized light oriented at ±45° with respect to said optic axes of said quarter-wave plates.

27. The etalon modulator of claim 26 wherein said linearly polarized light is monochromatic and wherein a portion of said light is coupled out of said cavity through said back reflective means, whereby applying said electric field to said liquid crystal cell modulates the intensity of the coupled-out light.

28. The etalon modulator of claim 27 wherein a second portion of said light is coupled out of said cavity through said front reflective means.

29. The etalon modulator of claim 28 further including means for separating, outside of said cavity, said linearly polarized light incident on said front reflective means from said second portion of light coupled out through said front reflective means.

30. The etalon modulator of claim 26 wherein said linearly polarized light is monochromatic and wherein light is coupled out of said cavity through said front reflective means, whereby applying said electric field to said liquid crystal cell modulates the phase of the coupled-out light.

31. The etalon modulator of claim 30 wherein the reflectivity of said back reflective means is approximately 100%.

32. The etalon modulator of claim 31 for use with an optical addressing signal and further comprising a photosensor means, optically coupled with said addressing signal and electrically connected with said electric field applying means, for varying the applied electric field in response to said addressing signal.

33. The etalon modulator of claim 26 wherein said linearly polarized light is polychromatic and wherein a portion of said light is coupled out of said cavity through said back reflective means, whereby applying said electric field to said liquid crystal cell modulates the wavelength of the coupled-out light.

34. The etalon modulator of claim 33 wherein said quarter-wave plates are achromatic quarter-wave plates.

35. The etalon modulator of claim 33 wherein a second portion of said light is coupled out of said cavity through said front reflective means.

36. The etalon modulator of claim 35 including means for separating, outside of said cavity, said linearly polarized light incident on said front reflective means from said second portion of light coupled out through said front reflective means.

37. The etalon modulator of claim 25 further including an isotropic spacer, located within said resonance cavity, for increasing the length of said resonance cavity.

38. The etalon modulator of claim 25 wherein said planar-aligned chiral smectic liquid crystal cell is selected from the group consisting of: a surface-stabilized SmA* cell, a surface-stabilized SmC* cell and a distorted helix ferroelectric cell.

39. The etalon modulator of claim 25 wherein said planar-aligned chiral smectic liquid crystal cell is a surface-stabilized SmA* cell.

40. The etalon modulator of claim 25 wherein said quarter-wave plates are zero-order quarter-wave plates.

41. The etalon modulator of claim 25 wherein said quarter-wave plates are achromatic quarter-wave plates.

42. The etalon modulator of claim 25 for use with an optical addressing signal and further comprising a photosensor means, optically coupled with said addressing signal beam and electrically connected with said electric field applying means, for varying the applied electric field in response to said addressing signal.

43. The etalon modulator of claim 25 further comprising a first polarization diversity means, located outside of said resonance cavity, for dividing said elliptically polarized light into two spatially separated components having orthogonal polarizations and for coupling said two components with said front reflective means.

44. The etalon modulator of claim 43 further comprising a second polarization diversity means, located outside of said resonance cavity, for receiving two spatially separated components having orthogonal polarizations from said back reflective means and for combining said two components into a single light beam.

45. The etalon modulator of claim 44 wherein said first and said second polarization diversity means each comprise a polarizing beam splitter.

46. The etalon modulator of claim 45 wherein a first portion of the intracavity light is coupled out of said cavity through said back reflective means and a second portion of said intracavity light is coupled out of said cavity through said front reflective means.

47. The etalon modulator of claim 46 further including means for separating, outside of said cavity, said elliptically polarized light coupled in through said front reflective means from said second portion of said intracavity light coupled out through said front reflective means.

48. The etalon modulator of claim 47 wherein said separating means comprises means for rotating polarization and a polarizing beam splitter.

49. The etalon modulator or of claim 25 further including a second half-wave plate comprising a second planar-aligned chiral smectic liquid crystal cell disposed between said first and said second quarter-wave plates, said second liquid crystal cell having a rotatable optic axis.

50. The etalon modulator of claim 49 wherein the first and the second planar-aligned chiral smectic liquid crystal cells are SmA* cells.

51. The etalon modulator of claim 50 wherein said optic axes of said first and said second liquid crystal cells are rotatable in opposite directions.

52. The etalon modulator of claim 49 wherein said second liquid crystal cell is a distorted helix ferroelectric cell.

53. The etalon modulator of claim 52 wherein the first liquid crystal cell is selected from the group consisting of: a surface-stabilized SmA* cell, a surface-stabilized SmC* cell and a distorted helix ferroelectric cell.

54. A reflection-mode etalon modulator of elliptically polarized light comprising:
front reflective means and back reflective means for providing an optical resonance cavity, and for coupling the elliptically polarized light into said resonance cavity through said front reflective means; and
a variable retarder positioned within said cavity, said variable retarder comprising:
a quarter-wave plate comprising a planar-aligned chiral smectic liquid crystal cell, said cell having a rotatable optic axis;
means for applying an electric field across said liquid crystal cell to rotate said optic axis; and
a passive quarter-wave plate positioned between said liquid crystal cell and said front reflective means;
wherein the combination of said half-wave plate with said quarter-wave plate and said back reflective means produces a retardance which is varied by rotation of said rotatable optic axis.

55. The reflection-mode etalon modulator of claim 54 wherein said elliptically polarized light is linearly polarized light, the polarization of said linearly polarized light oriented at ±45° with respect to the optic axis of said passive quarter-wave plate.

56. The reflection-mode etalon modulator of claim 54 further including an isotropic spacer, located within said resonance cavity, for increasing the length of said resonance cavity.

57. The reflection-mode etalon modulator of claim 54 wherein said planar-aligned chiral smectic liquid crystal cell is selected from the group consisting of: a surface-stabilized SmA* cell, a surface-stabilized SmC* cell and a distorted helix ferroelectric cell.

58. The reflection-mode etalon modulator of claim 54 wherein said planar-aligned chiral smectic liquid crystal cell is a surface-stabilized SmA* cell.

59. The reflection-mode etalon modulator of claim 54 wherein said passive quarter-wave plate is a zero-order quarter-wave plate.

60. The reflection-mode etalon modulator of claim 54 wherein the reflectivity of said back reflective means is 100% and wherein light is coupled out of said cavity through said front reflective means, whereby applying said electric field to said liquid crystal cell modulates the phase of the coupled-out light.

61. The reflection-mode etalon modulator of claim 60 for use with an optical addressing signal and further comprising a photosensor means, optically coupled with said addressing signal and electrically connected with said electric field applying means, for varying the applied electric field in response to said addressing signal.

62. The reflection-mode etalon modulator of claim 54 wherein the reflectivity of said back reflective means is less than 100%, whereby a first portion of said light is coupled out of said cavity through said back reflective means and a second portion of said light is coupled out through said front reflective means.

63. The reflection-mode etalon modulator of claim 54 for use with an optical addressing signal and further comprising a photosensor means, optically coupled with said addressing signal and electrically connected with said electric field applying means, for varying the applied electric field in response to said addressing signal.

64. A multiple pixel modulator comprising an array of etalon modulators, each etalon modulator comprising:
- front reflective means and back reflective means for providing an optical resonance cavity, and for coupling the elliptically polarized light into said resonance cavity through said front reflective means; and
- a variable retarder positioned within said cavity, said variable retarder comprising:
  - a half-wave plate comprising a planar-aligned chiral smectic liquid crystal cell said cell having a rotatable optic axis;
  - means for applying an electric field across said liquid crystal cell to rotate said optic axis; and
  - first and second quarter-wave plates positioned in series with and on either side of said half-wave plate, the optic axes of said quarter-wave plates oriented parallel or perpendicular to each other;
  - wherein the combination of said half-wave plate with said quarter-wave plates produces a retardance which is varied by rotation of said rotatable optic axis.

65. The multiple pixel modulator of claim 64 for use with an optical addressing signal and further comprising a photosensor means, optically coupled with said addressing signal and electrically connected with said electric field applying means, for varying the applied electric field in response to said addressing signal.

66. A multiple pixel reflection-mode modulator comprising an array of reflection-mode etalon modulators, each modulator comprising:
- front reflective means and back reflective means for providing an optical resonance cavity, and for coupling the elliptically polarized light into said resonance cavity through said front reflective means; and
- a variable retarder positioned within said cavity, said variable retarder comprising:
  - a quarter-wave plate comprising a planar-aligned chiral smectic liquid crystal cell, said cell having a rotatable optic axis;
  - means for applying an electric field across said liquid crystal cell to rotate said optic axis; and
  - a passive quarter-wave plate positioned between said liquid crystal cell and said front reflective means;
  - wherein the combination of said half-wave plate with said quarter-wave plate and said back reflective means produces a retardance which is varied by rotation of said rotatable optic axis.

67. The multiple pixel reflection-mode modulator of claim 66 for use with an optical addressing signal and further comprising a photosensor means, optically coupled with said addressing signal and electrically connected with said electric field applying means, for varying the applied electric field in response to said addressing signal.

68. A multipixel phase modulator for light comprising an array of variable retarders, each variable retarder comprising:
- a half-wave plate comprising a planar-aligned chiral smectic liquid crystal cell, said cell having a rotatable optic axis;
- means for applying an electric field across said liquid crystal cell to rotate said optic axis; and
- first and second quarter-wave plates positioned in series with and on either side of said half-wave plate, the optic axes of said quarter-wave plates oriented parallel or perpendicular to each other;
- wherein the combination of said half-wave plate with said quarter-wave plates produces a retardance which is varied by rotation of said rotatable optic axis.

69. The multiple pixel phase modulator of claim 68 for use with an optical addressing signal and further comprising a photosensor means, optically coupled with said addressing signal and electrically connected with said electric field applying means, for varying the applied electric field in response to said addressing signal.

70. A variable retarder for light comprising:
- a half-wave plate comprising a planar-aligned chiral smectic liquid crystal cell, said cell having a rotatable optic axis;
- means for applying an electric field across said liquid crystal cell to rotate said optic axis; and
- first and second circular polarizing means for circularly polarizing light, positioned in series with and on either side of said half-wave plate, such that said first circular polarizing means is positioned to receive incoming light and couple said light with said half-wave plate, said half-wave plate is positioned to couple said light with said second circular polarizing means;
- wherein the combination of said half-wave plate with said first and second circular polarizing means produces a retardance which is varied by rotation of said rotatable optic axis.

71. The variable retarder of claim 70 wherein said planar-aligned chiral smectic liquid crystal cell is selected from the group consisting of: a surface-stabilized SmA* cell, a surface-stabilized SmC* cell and a distorted helix ferroelectric cell.

72. The variable retarder of claim 71 wherein said first and second circular polarizing means comprise a first and second quarter-wave plate, respectively, the optic axes of said quarter-wave plates oriented parallel or perpendicular to each other.

73. The variable retarder of claim 72 wherein said incoming light is linearly polarized and wherein the optic axes of said quarter-wave plates are oriented at ±45° with respect to the axis of polarization of said incoming light.

74. The variable retarder of claim 70 wherein said planar-aligned chiral smectic liquid crystal cell is a planar-aligned SmA* cell.

* * * * *

UNITED STATES PATENT AND TRADEMARK OFFICE
CERTIFICATE OF CORRECTION

PATENT NO. : 5,381,253

DATED : January 10, 1995

INVENTOR(S) : Sharp et al.

It is certified that error appears in the above-identified patent and that said Letters Patent is hereby corrected as shown below:

In column 13, line 29, delete "elation" and replace with --etalon--.

In column 13, line 35, delete "VSLI" and replace with --VLSI--

In column 22, line 14, delete "L>d and L<d" and replace with --L=d and L<d--.

In column 26, in formulas 15, 17, 18 and 19, "A" and "W" which appear in the superscripts should appear as subscripts within the superscripts.

In column 27, in formulas 20, 21 and 22, "I" which appears in the superscripts following "φ" should appear as a subscript to the superscript.

In column 29, line 52, delete "$=\lambda_{105}$" and replace with --$=\lambda_\psi$--.

UNITED STATES PATENT AND TRADEMARK OFFICE
CERTIFICATE OF CORRECTION

PATENT NO. : 5,381,253

DATED : January 10, 1995

INVENTOR(S) : Sharp et al

It is certified that error appears in the above-indentified patent and that said Letters Patent is hereby corrected as shown below:

In column 33, formula 56, delete "$t^{22}$" and replace with --$t^2r^2$--

Signed and Sealed this

Twenty-fifth Day of April, 1995

Attest:

BRUCE LEHMAN

Attesting Officer

Commissioner of Patents and Trademarks